United States Patent
Dahl et al.

(10) Patent No.: US 11,550,419 B2
(45) Date of Patent: Jan. 10, 2023

(54) TOUCH-BASED INPUT DEVICE

(71) Applicant: SINTEF TTO AS, Trondheim (NO)

(72) Inventors: Tobias Gulden Dahl, Oslo (NO); Magnus Christian Bjerkeng, Oslo (NO); Andreas Vogl, Oslo (NO); Odd Kristen Østern Pettersen, Trondheim (NO)

(73) Assignee: SINTEF TTO AS, Trondheim (NO)

( * ) Notice: Subject to any disclaimer, the term of this patent is extended or adjusted under 35 U.S.C. 154(b) by 0 days.

(21) Appl. No.: 17/672,885

(22) Filed: Feb. 16, 2022

(65) Prior Publication Data

US 2022/0171491 A1 Jun. 2, 2022

Related U.S. Application Data

(63) Continuation of application No. 16/614,136, filed as application No. PCT/GB2018/051342 on May 17, 2018, now Pat. No. 11,287,917.

(30) Foreign Application Priority Data

May 19, 2017 (GB) ...................................... 1708100

(51) Int. Cl.
*G06F 3/041* (2006.01)
*G06F 3/042* (2006.01)

(52) U.S. Cl.
CPC ............ *G06F 3/0414* (2013.01); *G06F 3/042* (2013.01); *G06F 3/0416* (2013.01)

(58) Field of Classification Search
CPC ........ G06F 3/0414; G06F 3/042; G06F 3/043; G06F 3/0317; G06F 3/0436; G06F 3/0421; G01H 9/00; G01H 9/004; H04R 23/008
See application file for complete search history.

(56) References Cited

U.S. PATENT DOCUMENTS

| 7,411,581 B2 | 8/2008 | Hardie-Bick |
| 2005/0018541 A1 | 1/2005 | Johansen et al. |
| (Continued) |

FOREIGN PATENT DOCUMENTS

| JP | 2006323823 A | 11/2006 |
| JP | 2008113431 A | 5/2008 |
| (Continued) |

OTHER PUBLICATIONS

Notification of Transmittal of the International Search Report and Written Opinion (Form PCT/ISA/220), International Search Report (Form PCT/ISA/210), and Written Opinion (PCT/ISA/237) for International Application No. PCT/3B2018/051342 dated Oct. 11, 2018 (21 pages).

(Continued)

*Primary Examiner* — Ryan A Lubit
(74) *Attorney, Agent, or Firm* — Withrow & Terranova, P.L.L.C.; Vincent K. Gustafson

(57) ABSTRACT

An input device comprises a plurality of optical vibration sensors mounted in a common housing. Each optical vibration sensor comprises a diffractive optical element; a light source arranged to illuminate the diffractive optical element such that a first portion of light passes through the diffractive optical element and a second portion of light is reflected from the diffractive optical element; and a photo detector arranged to detect an interference pattern generated by said first and second portions of light. The optical vibration sensor is configured so that in use, after the first portion of light passes through the diffractive optical element, the first portion of light is reflected from a reflective surface onto the photo detector. The input device is placed in contact with a surface of a solid body, and an object is brought into physical contact with the surface of the solid body, thereby causing vibrations in the solid body. The vibrations are detected (Continued)

using two or more of the optical vibration sensors. The relative phase(s) of the vibrations are used to determine information regarding the point of contact of the object on the surface of the solid body.

20 Claims, 10 Drawing Sheets

(56) References Cited

U.S. PATENT DOCUMENTS

| | | |
|---|---|---|
| 2005/0083313 A1 | 4/2005 | Hardie-Bick |
| 2005/0174338 A1 | 8/2005 | Ing et al. |
| 2010/0321698 A1* | 12/2010 | Santhanakrishnan .... G01H 9/00 |
| | | 356/447 |
| 2012/0306823 A1 | 12/2012 | Pance et al. |
| 2015/0293243 A1 | 10/2015 | Avenson et al. |
| 2016/0007108 A1* | 1/2016 | Lee .................. H04R 1/08 |
| | | 381/111 |
| 2016/0239707 A1* | 8/2016 | Boshernitzan .......... G06F 3/043 |
| 2016/0266636 A1* | 9/2016 | Boshernitzan ........ G06F 1/3243 |
| 2021/0271338 A1 | 9/2021 | Dahl et al. |

FOREIGN PATENT DOCUMENTS

| | | |
|---|---|---|
| JP | 2009110229 A | 5/2009 |
| JP | 2009199158 A | 9/2009 |
| JP | 2012247300 A | 12/2012 |
| JP | 2017049185 A | 3/2017 |
| WO | 2016162701 A1 | 10/2016 |

OTHER PUBLICATIONS

Notice of Allowance for U.S. Appl. No. 16/614,136, dated Nov. 17, 2021, 10 pages.
Decision to Grant for Japanese Patent Application No. 2019563877, dated May 10, 2022, 6 pages.
Examination Report No. 1 for Australian Patent Application No. 2018268363, dated Apr. 4, 2022, 2 pages.

* cited by examiner

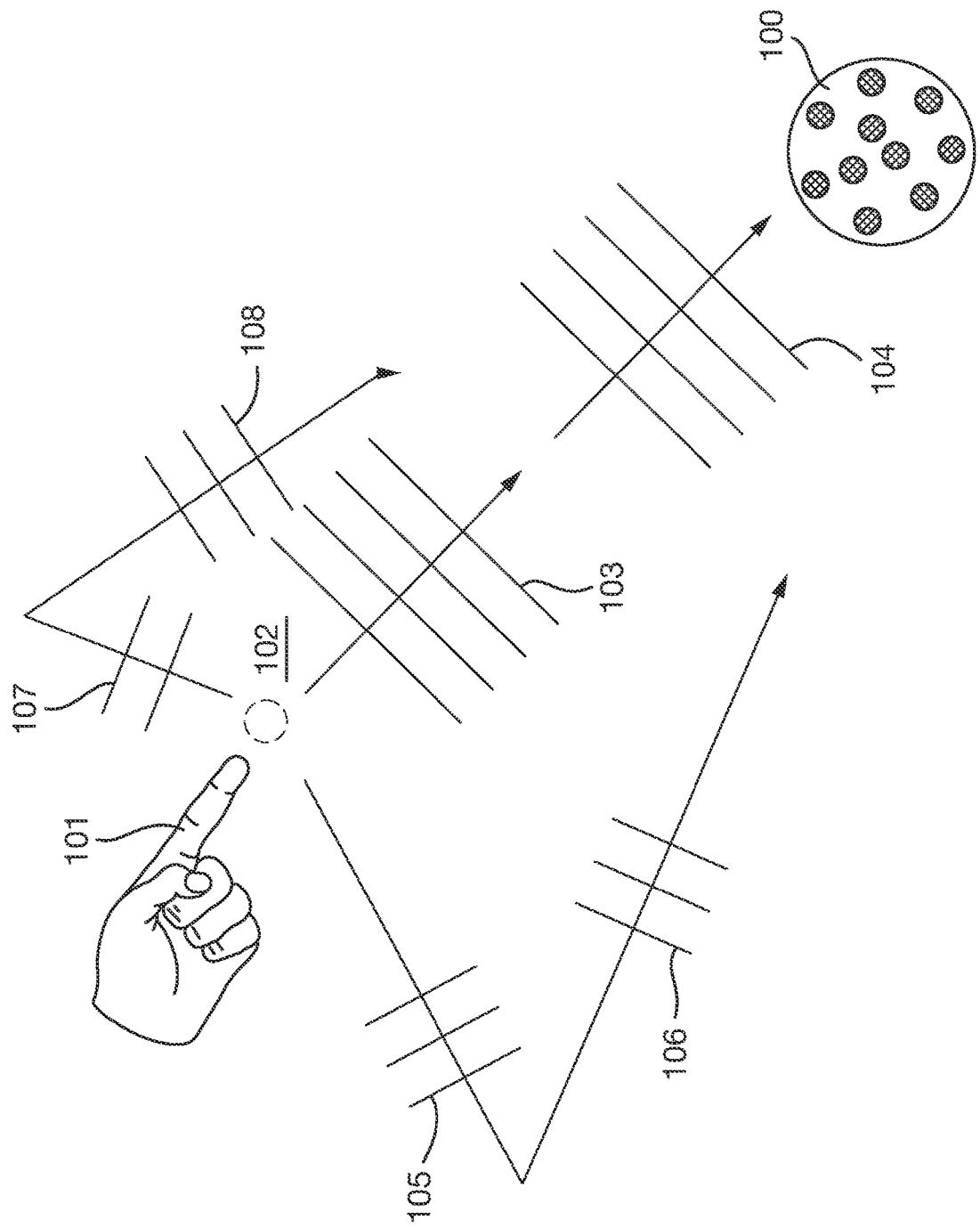

TOUCH-BASED INPUT DEVICE

CROSS-REFERENCE TO RELATED APPLICATIONS

This application is continuation of U.S. patent application Ser. No. 16/614,136 filed on Nov. 15, 2019 and subsequently issued as U.S. Pat. No. 11,287,917 on Mar. 29, 2022, which is a 35 U.S.C. § 371 national phase filing of International Application No. PCT/GB2018/051342 filed on May 17, 2018, and further claims priority to United Kingdom Patent Application No. 1708100.1 filed on May 19, 2017, wherein the disclosures of the foregoing applications and patent are hereby incorporated by reference herein in their respective entireties.

TECHNICAL FELD

The present invention relates to touch-based input devices, and in particular, to touch-based input devices that are easily portable but which provide a large touch input surface.

BACKGROUND

There is a wide variety of electronic user-operated devices that require means for a user to provide input to the device. Examples of such devices include computers, media devices, virtual reality devices, etc. Some common input devices include peripherals such as keyboards, computer mice, track balls, etc. However, some of these peripherals can be difficult to use or to learn to use, take up space, and provide a less convenient or less intuitive means for providing input. More recent input devices include touch-based input devices, such as touch screens or touch pads, for example, as disclosed in U.S. Pat. No. 7,411,581. However, such devices typically require a large touch input area to provide the desired input options to the user (e.g., such as providing touch input areas corresponding to letters and numbers in a keyboard layout for typing text and number input). In addition, for devices that rely on the detection of acoustic signals generated by the touch, the device needs to be large so that there is sufficient separation between the sensors that detect the acoustic signals to allow the phase difference and/or amplitude difference between detected signals to be discernible above the noise floor. Consequently, such devices are typically large and therefore not easily portable. Smaller touch-based input devices may not be suitable for some applications, e.g., collaborative work between multiple users.

When viewed from a first aspect, the invention provides a method of receiving an input by determining information regarding a point of contact of an object on a surface of a solid body, the method comprising:
a) placing an input device in contact with the surface of the solid body, wherein the input device comprises a plurality of optical vibration sensors mounted in a common housing, each optical vibration sensor comprising:
a diffractive optical element;
a light source arranged to illuminate said diffractive optical element such that a first portion of light passes through the diffractive optical element and a second portion of light is reflected from the diffractive optical element; and
a photo detector arranged to detect an interference pattern generated by said first and second portions of light;
wherein the optical vibration sensor is configured so that in use, after the first portion of light passes through the diffractive optical element, the first portion of light is reflected from a reflective surface onto the photo detector;
b) bringing the object into physical contact with the surface of the solid body, thereby causing vibrations in the solid body;
c) detecting the vibrations using two or more of the optical vibration sensors; and
d) using the relative phase(s) of the vibrations to determine the information regarding the point of contact of the object on the surface of the solid body.

The invention extends to an input device comprising a plurality of optical vibration sensors mounted in a common housing, each optical vibration sensor comprising:
a diffractive optical element;
a light source arranged to illuminate said diffractive optical element such that a first portion of light passes through the diffractive optical element and a second portion of light is reflected from the diffractive optical element; and
a photo detector arranged to detect an interference pattern generated by said first and second portions of light;
wherein the optical vibration sensor is configured so that in use, after the first portion of light passes through the diffractive optical element, the first portion of light is reflected from a reflective surface onto the photo detector;
wherein the input device is adapted to be placed on or attached to the surface of a solid body; and
wherein the input device is configured:
using two or more of the optical vibration sensors, to detect vibrations caused by an object being brought into physical contact with the surface of the solid body; and
to use the relative phase(s) of the vibrations to determine information regarding the point of contact of the object on the surface of the solid body.

Thus it will be appreciated that in accordance with the invention, an input device may be placed on or attached to a solid body (e.g., a table top, floor, wall, etc.) so that when an object (e.g., a user's hand or finger, or an input object such as a stylus, pen, etc.) touches the surface of the solid body on which the input device is placed or attached, vibrations originating at the point of contact of the touch propagate through the solid body to the positions of optical vibration sensors in the input device. The vibrations are detected by the optical vibration sensors, and their relative phase(s) are used to determine the information regarding the point of contact by determining the origin of the vibrations. The information regarding the point of contact may comprise, as non-limiting examples, the position of the point of contact, the direction in which the point of contact lies relative to the input device, the duration of contact, and/or the distance between the point of contact and the input device. The point of contact may be a single stationary point (e.g., a tap on the surface) or a moving point (e.g., a swipe across the surface). For a moving point of contact, the information regarding the point of contact may comprise, as non-limiting examples, the direction of movement of the point, a series of positions traced by the point of contact, the start and end locations of a series of positions traced by the point of contact, a shape traced by the point of contact, and/or the duration of contact. Accordingly, by placing the input device, which may be relatively small, on a relatively large solid body surface, any surface that can allow the propagation or vibrations can be used as a touch input surface, even if the solid body is not a part of the electronic device for which input is to be provided. For example, the solid body can be an everyday object such as a table or another surface of a solid object such as a wall. This provides the advantage that the input device, being relatively small, can be easily transported to a location and then set up on a solid body such as a table, wall, etc. that is already available at the location to provide a large input touch surface.

In accordance with the invention, the relative phase(s) of the vibrations are used to determine information regarding the point of contact of the object on the surface of the solid body. In a set of preferred embodiments, use is also made of the relative amplitude(s) of the vibrations to determine information regarding the point of contact of the object on the surface of the solid body. This recognises that these amplitudes may provide useful information as to the relative distance of the object to the respective sensors since the amplitude of the signal can be related to its distance of travel by the attenuation which may be calculated theoretically and/or determined empirically.

The input device may be attached to the solid body in use, but this is not essential. Input devices in accordance with the invention are advantageous in that they do not need to be fixedly attached to the solid body in order for vibrations to be detected by the optical vibration sensors. The input device may be placed on the solid body in use without being fixedly attached, e.g., it may rest on the surface, being held in place by gravity and/or friction. To provide improved coupling between the solid body surface and the optical vibration sensors, the input device may be provided with additional mass to increase the force due to gravity holding the input device in place. Such additional weight may conveniently be provided by a large battery, giving the additional advantage of increased battery life.

The Applicant has appreciated that input devices in accordance with the invention are capable of detecting vibrations propagating through the solid body and well as vibrations propagating across the solid body surface. This advantageously allows one or more input devices to be placed in contact with a different part of the solid body surface from the part of the surface where the point of contact is made. Thus, it will be understood that when it is said that the point of contact and the input device(s) are on the surface of the solid body, this is not limited to the point of contact and input device(s) being on the same region or face of the solid body. In some embodiments, the input device(s) is/are placed on a different (e.g., opposing) region or face of the solid body from the region or face where the point of contact is made. For example, the input device(s) may be attached to the underside of a table while the point of contact is made on the top surface of the table. As another example, the input device(s) may be attached to the back of a wall, while the point of contact is made on the front of the wall. This advantageously allows a user to make a touch input point of contact anywhere on a side or face (e.g., a front or top surface) of a solid body without having to avoid a region occupied by the input device(s). Such arrangements may also be aesthetically more attractive.

The information regarding the point of contact with the surface (including but not limited to the position of the point of contact, the location of a swipe, the direction of a swipe, the series of positions traced by a swipe, the duration of a tap or swipe) may be determined from direct vibrations, i.e., from vibrations propagating from the point of contact directly to the input device, or from indirect vibrations, i.e., from vibrations originating at the point of contact that have been reflected from a boundary of the surface (e.g., a table edge) or other discontinuity before reaching the input device.

In a set of embodiments, the information regarding the point of contact with the surface is determined from a detected composite signal comprising direct and indirect vibrations (e.g., the sum of direct and indirect vibrations). In a set of such embodiments, an estimate of the direct signal may be subtracted from the composite signal to give a residual signal, e.g., consisting of one or more indirect signals substantially without the direct signal. The direct signal may be estimated from the detected composite signal—e.g., by determining a maximum energy peak and/or using a time window. The information regarding the point of contact with the surface may be determined from the residual signal. This may be particularly useful for determining information about a swipe, especially a swipe that is (or has a substantial component) perpendicular to an array of optical vibration sensors. This is because the angle of arrival of the direct path signal will not change significantly during such a gesture, whereas the indirect signal derived from a reflection, e.g., from a surface edge, will tend to arrive at an angle which changes throughout the gesture.

In a set of embodiments, the information regarding the point of contact with the surface is determined using one or more estimated partial impulse responses. An estimated partial impulse response is an estimate of part of the composite signal (i.e., including both direct and indirect signals) that is expected to be detected by an array of optical vibration sensors for a corresponding expected touch input. The term "partial" refers to the fact that only part of the expected impulse response may be estimated, for example, there may be portions (e.g., temporal regions) where no expected signal is specified. The actual detected signal may then be matched to an estimated partial impulse response for an expected touch input, e.g., a best match may be identified, or a match that is closer to the actual detected signal than other possible matches by a specified margin. The expected touch input corresponding to the best match partial impulse response may be identified as corresponding to the actual touch input that produced the detected vibrations.

It will be appreciated that using the relative phase(s) and optionally the relative amplitude(s) of the vibrations to determine information regarding the point of contact encompasses techniques such as beamforming known per se in the art as well as more simple phase difference calculations and/or amplitude difference calculations.

As the vibrations originate from an impact of an object on a solid surface, it will be understood that the propagating vibrations will comprise a range of frequencies. The input device may use some or all of the frequencies present in the vibrations to determine information about the point of contact. In a set of embodiments, the input device uses a range or subset of frequencies of the vibrations preferentially or exclusively to determine information about the point of contact.

In a set of embodiments, the method comprises determining one or more parameters relating to the solid body. The parameter(s) may comprise one or more selected from the group including the height, width, depth, radius, shape, material and/or density of the solid body. The method may comprise obtaining an overdetermined set of equations relating the position of the point of contact to the parameters of the solid body. The input device may comprise sufficient sensors to obtain said overdetermined set of equations, e.g., there may be at least three, at least four, at least five or at least six sensors. Additionally or alternatively, the method may comprise determining the position of the input device on the solid body (e.g., the relative position with respect to a boundary or other feature of the solid body).

In some embodiments, the reflective surface from which the first portion of light is reflected is the surface of the solid body. In such embodiments, the input device may comprise one or more apertures or transparent windows, wherein the aperture(s) or transparent window(s) is/are positioned to allow the first portion of light to propagate from the respective diffractive optical elements to the reflective surface, and then from the reflective surface to the respective photo detector. A single aperture or window could be provided, or a plurality thereof, e.g., one per sensor. In such embodiments, the solid body may be provided with a reflective covering, for example, a reflective mat or sheet. It will be understood that when it is said that the reflective surface may be the surface of the solid body, this includes the possibility that the solid body comprises a reflective covering, where the reflective covering reflects the first portion of light.

In some embodiments, each optical vibration sensor comprises a membrane. In such embodiments, the membrane preferably comprises the reflective surface from which the first portion is reflected. Each optical vibration sensor may comprise a mechanical coupling between the membrane and the solid body surface. It will be appreciated that as the input device is intended to be placed on or attached to a surface during use and then removed afterwards, the mechanical coupling is preferably not fixedly attached to the surface of the solid body. Instead, the mechanical coupling may be fixedly attached to or integrally formed with the membrane, and positioned so that it is in physical contact with the solid body surface when the input device is in use. The mechanical coupling may comprise a mass attached to the membrane. For example, a ball or weight may be attached to the membrane, (e.g., to the side of the membrane that faces the solid body surface in use), and positioned so that the ball or weight is in physical contact with the surface when the input device is in contact with the solid body surface. Vibrations in the solid body surface can thus propagate to the membrane via the mechanical coupling. The motion of the membrane thus corresponds to the phase and amplitude of the vibrations in the solid body surface. However, it is not essential for the optical vibration sensors to comprise respective membranes. For example, where the reflective surface comprises the solid body surface (as discussed in the preceding paragraph), the amplitude of the vibration in the solid body surface may be determined directly from the solid body surface, rather than via a membrane, because the first portion of light is reflected from the solid body surface.

It will be appreciated that the detection of vibrations is achieved as a result of the variation in distance between the diffractive optical element and the reflective surface. This is because the interference pattern depends on the optical path difference between the first and second portions of light. Accordingly, it will be appreciated that the detection of vibrations may be achieved because the membrane or the surface of the solid body is vibrating, i.e., moving, with respect to the diffractive optical element in each optical vibration sensor, which may be substantially stationary on the scale of the vibration amplitude. In such embodiments, the common housing may be shaped so that, in regions of the common housing adjacent to the optical vibration sensors, there is no physical contact between the common housing and the solid body. For example, the common housing may be in contact with the solid body only at the periphery of the common housing.

However, it is not necessary for the optical vibration sensors to be stationary or substantially stationary. For example, the vibrations in the solid body may propagate to the optical vibration sensors via the common housing and/or via the respective membranes and mechanical couplings. In particular, in some embodiments, the common housing is shaped so that there is physical contact between the common housing and the solid body in regions of the common housing adjacent to the optical vibration sensors. As a result, vibrations in the solid body may propagate into the common housing, and thus into the optical vibration sensors. In such embodiments, the optical vibration sensors may each comprise a membrane that is not mechanically coupled to the solid body. The membrane may comprise a mass attached thereto, wherein the mass is not in contact with the solid body during use. In such embodiments, relative motion between the membrane and the diffractive optical element may occur due to the sensor housing vibrating while the membrane remains substantially stationary due to the inertia of the mass on the membrane, i.e., each vibrational sensor may function as an optical accelerometer.

The Applicant has appreciated that the performance of the input device can be improved by providing each optical vibration sensor with a sensor housing, and mounting each sensor housing containing the optical vibration sensor in the common housing (i.e., so that the common housing comprises a main housing and a plurality of sensor housings). This provides the advantage that the sensor housings can be made from a different material from the main housing. In particular, the main housing may be made of a material that suppresses the propagation of vibrations. This provides the advantage that vibrations in one sensor housing are attenuated in their propagation to adjacent sensor housings, thereby reducing or eliminating cross-talk between the sensors.

As used herein, cross-talk refers to the propagation of vibrations from one optical vibration sensor to another, especially between sensor housings and especially between adjacent sensors. In particular, in some embodiments, vibrations are intentionally propagated from the solid body to each sensor housing or to a respective membrane attached to each sensor housing to cause relative movement between the reflective surface and the optical diffractive element. If these vibrations propagate to adjacent sensor housings, this may result in the adjacent optical vibration sensor incorrectly recording the presence of a vibration at its location. This may prevent the input device working correctly.

In some embodiments, the average density of each sensor housing is higher than the average density of the portion of the main housing connecting the sensors. It will be appreciated that materials of lower density propagate vibrations less effectively, and so having a lower density material in the portions between the sensors serves to suppress vibrations propagating between the sensor housings.

This is novel and inventive in its own right, and so when viewed from a second aspect, the invention provides an input device for detecting vibrations in a solid body when the input device is in contact with a surface of said solid body, the device comprising:
- a main housing;
- a plurality of sensor units mounted in the main housing, each sensor unit comprising a sensor housing and an optical vibration sensor mounted in the sensor housing, wherein each optical vibration sensor comprises:
  - a diffractive optical element;
  - a light source arranged to illuminate said diffractive optical element such that a first portion of light passes through the diffractive optical element and a second portion of light is reflected from the diffractive optical element; and
  - a photo detector arranged to detect an interference pattern generated by said first and second portions of light;
- wherein the optical vibration sensor is configured so that in use, after the first portion of light passes through the diffractive optical element, the first portion of light is reflected from a reflective surface onto the photo detector;
- wherein the average density of each sensor housing is higher than the average density of the portion of the main housing connecting the sensors.

Features of the first aspect may also be features of the second aspect and vice versa.

A significant advantage of both aspects of the present invention is that they provide the possibility of using an array of closely spaced sensors to detect a touch position, allowing the input device itself to be compact, e.g., in the form of an array that can be retrofitted or placed essentially at a single point on the surface where the touch is to be detected.

This is in contrast with input devices of the prior art. In prior art devices, the determination of the phase difference and/or amplitude difference between vibrations detected by two or more sensors requires a large distance between the sensors. This is because there needs to be sufficient spacing between the sensors for there to be any observable phase difference and/or amplitude difference. For example, two sensors placed at exactly the same location would see the same signal and hence the phase difference would be zero. For sensors spaced a small distance apart, although there would be a small phase difference, this would typically be drowned by self-noise of the sensors and thus this approach is not used in the prior art. In practice, one will not just be subtracting two signals, but instead two signals plus the sensor noise. For example, let the signal received at a first sensor be x (which consists of a signal $s_1$ and noise $n_1$) and the signal received at a second sensor be y (which consists of a signal $s_1$ and noise $n_1$). Both x and y are complex numbers, as they are computed based on an fast Fourier transform of the received signal within a time-sample.

$$x = s_1 + n_1 \qquad \text{Eq. 1}$$

$$y = s_2 + n_2 \qquad \text{Eq. 2}$$

$$w = x - y = [s_1 - s_2] + [n_1 - n_2] \qquad \text{Eq. 3}$$

Note that the closer the sensors are placed, the smaller the magnitude of the first term, i.e., $|s_1 - s_2|$, will be. The magnitude of the cumulative error, i.e., $|n_1 - n_2|$ will not change as the sensors are moved closer together. The result of moving the sensors closer together is therefore a deterioration of the SNR of the fingerprint or estimator w, i.e.

$$SNR = \frac{|s_1 - s_2|}{|n_1 - n_2|} \qquad \text{Eq. 4}$$

gets worse as the sensors are put closer together. Although the above relates to raw narrowband or Fourier coefficients of signal differences, i.e., $s_1 - s_2$, the same reasoning applies to the phase and magnitude of the signals. Typically, the difference between the signal phases and the difference between the signal magnitudes will both decrease as the distance between the sensors decreases, but this is generally not true for the noise part of the SNR.

However, the Applicant has appreciated that optical vibration sensors as described above in the context of the present invention, e.g., optical MEMS accelerometers, have sufficiently low sensor noise to allow the sensors to be placed much closer together in a compact input device while still yielding a sufficiently good SNR for accurate position location via phase differences, including simple phase difference calculation as well as more sophisticated (e.g., beamforming) methods. In addition, the closer spacing of the sensors allows one to fit many more sensors into an array that is still relatively small. This is advantageous, e.g., because it allows for sophisticated techniques such as beamforming.

The advantages discussed above are achieved to an even greater degree in embodiments configured to reduce crosstalk between the sensors by using relatively low density main housing material, as described above.

The sensor housings may be positioned so that they are in contact with the solid body surface when the input device is in use. In such embodiments, the optical vibration sensors may each comprise a membrane that is not mechanically coupled to the solid body. The membrane may comprise a mass attached thereto, wherein the mass is not in contact with the solid body during use. In such embodiments, relative motion between the membrane and the diffractive optical element may occur due to the sensor housing vibrating while the membrane remains substantially stationary due to the inertia of the mass on the membrane, i.e., each vibrational sensor may function as an optical accelerometer.

In any embodiments comprising a mass and/or mechanical coupling attached to the membrane, a part of the mass and/or mechanical coupling may be on the side of the membrane facing the grating. Accordingly, it will be understood that when it is said that the reflective surface may comprise the membrane, this includes the possibility that the membrane comprises the mass and/or mechanical coupling so that the first portion of light may be reflected by a part of the mass and/or mechanical coupling.

In a set of embodiments, each sensor housing is mounted in the main housing by means of a flexible suspension. For example, the suspension may be an elastic member connecting the sensor housing and the main housing. The suspension may be made from silicone, rubber, foam or any other suitable material. This advantageously helps to reduce the propagation of vibrations from each sensor housing into the main housing, thus further reducing cross talk.

The sensor housings may be made of any suitable material, e.g., metal, such as stainless steel or aluminium. The sensor housings may be made from a material with a density above 2.5 g/cm³, preferably above 5.0 g/cm³, more preferably above 7.5 g/cm³.

The portion of the main housing connecting the sensors may be made from any suitable material, and preferably a material that reduces the propagation of vibrations compared with the material of the sensor housings, e.g., foam or rubber. Preferably the portion of the main housing connecting the sensors is made from a material with a density below 0.5 g/cm$^3$, more preferably below 0.2 g/cm$^3$, most preferably below 0.1 g/cm$^3$. Preferably the portion of the main housing connecting the sensors is made from a material with a density that is less than 20% of the density of the sensor housing material, more preferably less than 10%, most preferably less than 5%.

As noted above, the input device is preferably small enough to be easily portable. Accordingly, in preferred embodiments, the input device has a maximum dimension of less than 0.2 m, more preferably less than 0.1 m, most preferably less than 0.05 m.

As previously explained it may be advantageous in some embodiments for the device to be relatively heavy to give a good coupling with a surface on which it rests. For example in a set of embodiments the device has a mass of more than 0.2 kg, e.g., more than 0.5 kg.

The provision of a main housing material that reduces the propagation of vibrations provides the advantage that the optical vibration sensors can be provided close together without resulting in significant cross talk. In some preferred embodiments, the separation between adjacent sensor housings is less than 1 cm, more preferably less than 0.5 cm. The separation between adjacent optical vibration sensors may be less than 4 cm, preferably less than 2 cm, more preferably less than 1 cm, e.g., less than 0.5 cm or less than 0.25 cm. As used herein, the separation between adjacent optical vibration sensors means the distance between a position on one optical vibration sensor (e.g., a centre point) and the same position on an adjacent optical vibration sensor.

In a set of embodiments, the input device comprises a processor. The processor may be configured to use the relative phase(s) and optionally the relative amplitude(s) of vibrations detected by the optical vibration sensors to determine information regarding a point of contact of an object on the surface of the solid body in accordance with the methods of the invention. Additionally or alternatively, the input device may be configured for communication with a remote processing device. The determination of information regarding the point of contact of the object on the surface of the solid body using the relative phase(s) and optionally the relative amplitude(s) may be carried out partially or fully by the remote processing device.

The plurality of optical vibration sensors in the input device may be arranged in an array, preferably a two-dimensional array. For example, the optical vibration sensors may be arranged in a square lattice arrangement. This may be used for detecting vibrations at positions in a Cartesian coordinate system. The optical vibration sensors may be arranged in a radial arrangement, e.g., concentric circles. This may be used for detecting vibrations at positions in a polar coordinate system.

While it will be appreciated that some useful data may be obtained using as few as two optical vibration sensors in the input device, preferably the input device comprises at least nine optical vibration sensors, more preferably at least 16, e.g., at least 25.

Using the relative phase(s) and (where used) the relative amplitude(s) of the vibrations to determine information regarding a point of contact on the surface may comprise using a direction of arrival algorithm. Suitable direction of arrival algorithms are known in the art, for example, MUSIC and ESPRIT.

The method may comprise determining a radius of curvature of a vibration wavefront originating at the point of contact to determine a distance from the input device to the point of contact.

The method may comprise using two input devices in accordance with the invention, where each input device determines a direction of arrival of a vibration wavefront from the point of contact, and determining an intersection of the directions of arrival to determine the position of the point of contact on the surface.

The diffractive optical element is preferably a grating, however it may be any other suitable optical element, e.g., a diffractive lens.

In embodiments comprising a membrane, the membrane may be made from any suitable material. In some preferred embodiments, the membrane is made from silicon, although other materials could be used, e.g., silicon nitride. The membrane may be manufactured by depositing the membrane material on a substrate, and then etching away a portion of the substrate under the membrane material to leave a support connected to the membrane at its periphery. In embodiments comprising a membrane, e.g., a silicon nitride membrane, the membrane may comprise one or more corrugation(s), which may increase the compliance of the membrane compared with a flat membrane. Membranes with increased compliance exhibit a greater displacement in response to a given pressure, and are therefore more sensitive to vibrations. Such membranes may thus improve the performance of the input device by making it more sensitive to vibrations.

In embodiments comprising a membrane, another suitable resilient element may be used in the place of the membrane, e.g., a spring. In such embodiments, the spring may be used to support a mass and/or mechanical coupling, as discussed above, wherein the mass and/or mechanical coupling serves as the reflective surface.

One or more input devices in accordance with the present invention may be used in conjunction with a virtual reality system. This is particularly advantageous as such systems present a challenge in allowing users to provide anything more than a crude input since they are not really compatible with use of a standard keyboard or touchscreen. Input devices in accordance with the present invention may be used to set up a virtual reality space, e.g., by placing input devices at a plurality of locations in a room, e.g., on the walls and floor, or on a desk. The virtual reality system may provide the user with a visual representation of an input system (e.g., buttons, objects or other features) that the user can interact with, where the visual representations corresponds to positions on the solid body (e.g., a wall, a desk) to which the input device is attached.

In accordance with the foregoing aspects of the invention, the relative phase(s) of the vibrations are used to determine information regarding the point of contact of the object on the surface of the solid body, with the relative amplitude(s) of the vibrations optionally also being used. However, the Applicant has appreciated that due to, for example, the low self-noise and related advantages of optical vibration sensors, it is also possible to determine information regarding the point of contact of the object on the surface using the relative amplitude(s) of the vibrations without using the relative phase(s).

Thus when viewed from a third aspect, the invention provides a method of receiving an input by determining information regarding a point of contact of an object on a surface of a solid body, the method comprising:

a) placing an input device in contact with the surface of the solid body, wherein the input device comprises a plurality of optical vibration sensors mounted in a common housing, each optical vibration sensor comprising:
   a diffractive optical element;
   a light source arranged to illuminate said diffractive optical element such that a first portion of light passes through the diffractive optical element and a second portion of light is reflected from the diffractive optical element; and
   a photo detector arranged to detect an interference pattern generated by said first and second portions of light;
   wherein the optical vibration sensor is configured so that in use, after the first portion of light passes through the diffractive optical element, the first portion of light is reflected from a reflective surface onto the photo detector;
b) bringing the object into physical contact with the surface of the solid body, thereby causing vibrations in the solid body;
c) detecting the vibrations using two or more of the optical vibration sensors; and
d) using the relative amplitude(s) of the vibrations to determine the information regarding the point of contact of the object on the surface of the solid body.

This aspect of the invention extends to an input device arranged to carry out the aforementioned method. Optional or essential features of the first and second aspects of the invention may also be features of the third aspect.

BRIEF DESCRIPTION OF THE DRAWINGS

Certain preferred embodiments will now be described, by way of example only, with reference to the accompanying drawings, in which:

FIG. 8 illustrates a method of determining a touch position and surface parameters using reflected vibrations;

DETAILED DESCRIPTION

Figure 1:
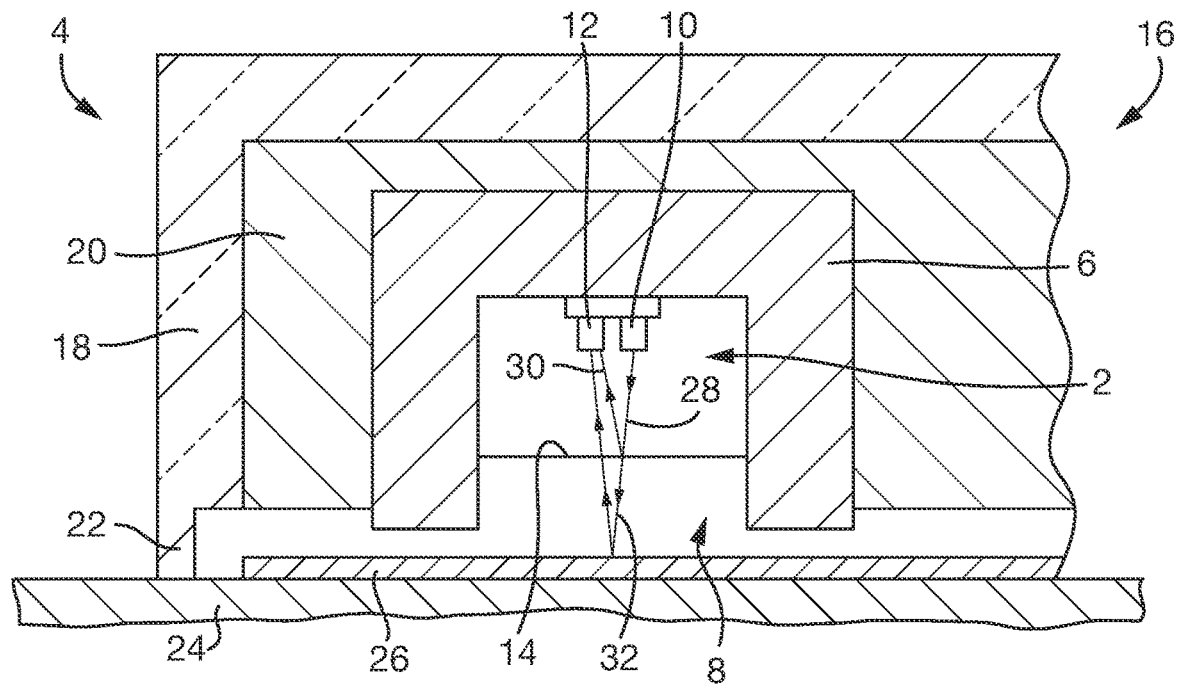
FIG. 1 shows an optical vibration sensor in an input device in accordance with a first embodiment of the present invention.

FIG. 1 shows an optical vibration sensor 2 mounted in an input device 4 in accordance with a first embodiment of the present invention. The optical vibration sensor 2 is manufactured using standard micro-electromechanical systems (MEMS) technology. The optical vibration sensor 2 is mounted in a sensor housing 6 with an opening 8 at lower end thereof. The optical vibration sensor 2 comprises a laser diode 10, a photo detector 12 and a diffraction grating 14, which are mounted in the housing 6.

The input device 4 comprises a main housing 16, which comprises an outer housing portion 18, and an internal housing portion 20. The internal housing portion 20 is made from foam to suppress the propagation of vibrations. The sensor housing 6 is made of a higher density material such as stainless steel. The outer housing portion 18 is provided with a peripheral rim 22 upon which the input device 4 rests when it is placed on a table surface 24. A reflective mat 26 is provided on the table top surface 24. The reflective mat 26 is easily portable along with the input device, e.g., it may be provided as a single piece that can be rolled up, or multiple smaller pieces, e.g., tiles, that can be arranged on the table top surface 24.

It should be appreciated that the mat is not essential and that the device could be placed directly on a suitable surface. No fixing is necessary; the weight of the device (which may be contributed to significantly by a large internal battery) could provide the necessary coupling. Equally it could be mounted to a surface—e.g., on the opposite face to that which is intended to be touched by a user.

In use, the input device 4 rests on the surface 24, and a user touches the surface 24 in a region in a vicinity of (but not necessarily close to or immediately adjacent) the input device. For example, the input device may be placed in a corner of a table, and a user may tap elsewhere on the table. The contact of the user's finger or an input object causes vibrations in the surface 24, which propagate towards the input device 4 and into the reflective mat 26 underneath the optical vibration sensor 2.

To detect the vibrations using the optical vibration sensor 2, the laser diode 10 projects a laser beam 28 towards the diffraction grating 14. A first portion 30 of the radiation is reflected from the grating 14 onto the photo detector 12. A second portion 32 is transmitted and diffracted by the grating 14, and impinges on the reflective mat 26 which reflects the second portion 32 onto the photo detector 12. The first and second portions 30, 32 interfere to form an interference pattern at the photo detector 12. The interference pattern is dependent on the relative phase of the first and second portions 30, 32, and therefore depends on the distance between the grating 14 and the reflective mat 26 (which, as noted above, vibrates along with the surface 24 following the touch by the user).

The vibrations may also propagate into the outer housing portion 18 via the rim 22, but due to the material of the inner housing portion 20, which suppresses vibrations, the vibrations do not propagate to the sensor housing 6. Consequently, the sensor housing 6 and the grating 14 mounted therein are substantially isolated from the surface 24 as it vibrates. As a result, the distance between the grating 14 and the reflecting mat 26 varies according to the vibrational amplitude. The interference pattern that is detected at the photo detector 12 therefore also varies with the vibration amplitude, as explained below.

When the first and second portions of light are reflected and transmitted respectively by the grating, they are diffracted to form a diffraction pattern having a number of peaks corresponding to zeroth, first, second etc. orders. The photodetector is positioned to receive the zeroth order peaks of both portions of light, although it could also be positioned to receive the first order peaks, or a higher order. In some embodiments, two photo detectors are provided in each sensor, where one photo detector is positioned to receive the zeroth order peaks and the other to receive the first order peaks. Focusing optics may be used to direct the peaks onto the respective photo detectors, or this could be achieved by the diffractive element itself (e.g., in some embodiments, the diffractive element is a Fresnel diffractive lens, which focuses the relevant diffraction order peak to a point).

To derive the separation of the reflective surface 24 and the grating 14 (and thus the vibration amplitude) from the interference pattern, the resultant amplitude of the zeroth order peaks (and/or of the first order peaks) of the interfering diffraction patterns are measured. When the optical path length between the grating 14 and the reflective mat 26 is half of the wavelength $\lambda$ of the laser light 28 or an integer multiple thereof, the zeroth diffraction order peaks constructively interfere and the first order peaks destructively interfere. The light received at the photo detector 12, which receives the zeroth order peak, is therefore at a maximum. If a second photodetector is provided to receive the first order peak, the light it receives is at a minimum. When the optical path length is $(2n+1)\lambda/4$, where n is an integer, the zeroth diffraction order peaks constructively interfere instead, so the light received at the photodetector 12 is at a minimum, while at the second photo detector (if provided) the received light would be at a maximum. Having two photodetectors therefore extends the dynamic range of the sensor. As will be appreciated, the optical path length is dependent on the physical distance between the grating and the surface, e.g., the optical path length and the physical distance may be equal, or otherwise related by in a way that can be measured or calculated.

Figure 2:
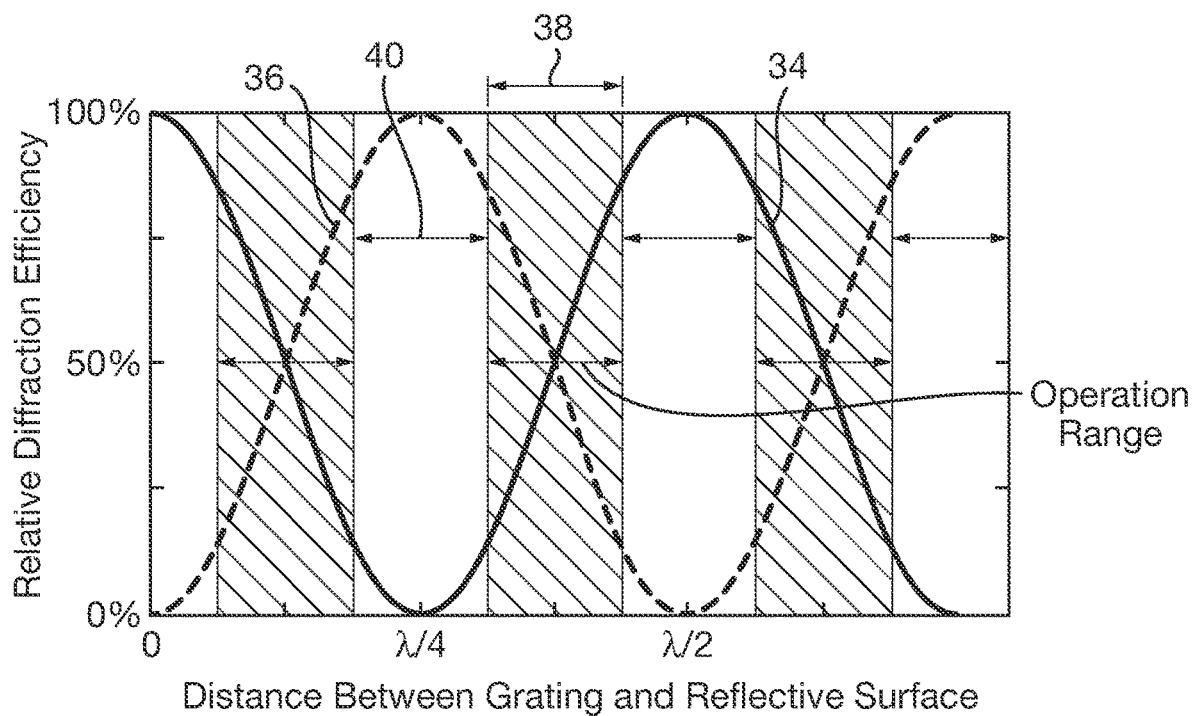
FIG. 2 shows the relationship between light intensity recorded at the photodetector and the separation between the grating and the reflective surface.

FIG. 2 shows how the intensity of light recorded by the photodetector 12 varies with the separation between the grating 14 and the reflective mat surface 26. The solid line 34 corresponding to the first order intensity. The dashed line 36 corresponds to the second order intensity, recorded at the second photo detector, if provided.

The sensitivity of the vibration sensor is determined by the change in output signal for a given change in displacement of the reflective surface. It can be seen from FIG. 4 therefore that the maximum sensitivity occurs in the operation zones 38 in which the lines 34, 36 have maximum gradient. This is also the zone in which the gradient is approximately linear, and corresponds to a separation between the membrane 14 and reflective mat surface 26 of around $(2n+1)\lambda/8$, where n is an integer. Elsewhere, i.e., where the separation is around $n\lambda/8$, where n is an integer, there are regions 40 of low sensitivity. Accordingly, the optical vibration sensor 2 is configured and positioned in the input device so that when the input device 4 is in use, the distance between the grating and the reflective surface is at or near the centre of one of the operation range zones 38.

Although it is possible to measure the vibrations with only one photodetector, having two photodetectors to measure the zeroth and first diffraction orders respectively may advantageously provide an extended dynamic range.

By recording the variation in light intensity detected at the photodetector 12 in the manner described above, the phase and amplitude of vibrations at a point directly underneath the vibrational sensor 2 can be determined. As discussed further below, the input device 4 comprises a plurality of optical vibration sensors 2, and so the vibrations at a plurality of points on the reflective mat 26 can be detected in this way.

Figure 3:
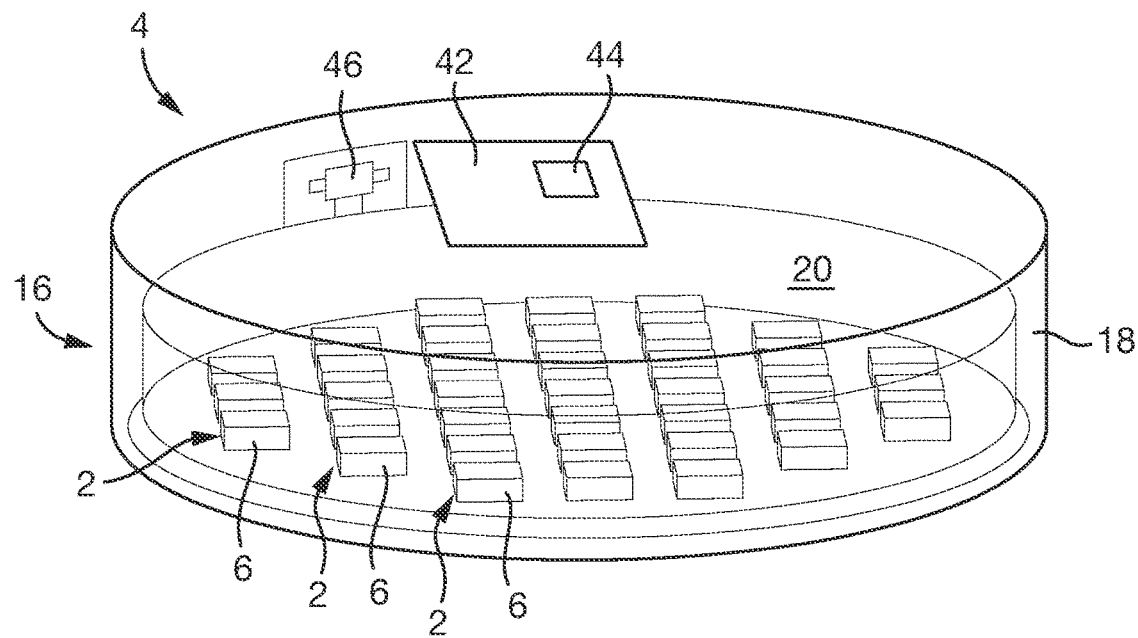
FIG. 3 shows an input device in accordance with an embodiment of the present invention.

FIG. 3 shows an input device 4 in accordance with an embodiment of the present invention. The input device 4 comprises a main housing 16, which comprises an outer housing portion 18 and an internal housing portion 20. Mounted in the internal housing portion 20 is a plurality of optical vibration sensors 2, each mounted in a respective sensor housing 6. The internal housing portion 20 is made from foam to reduce or prevent propagation of vibrations between the optical vibration sensors 2, thus reducing or eliminating cross talk between the sensors 2. The optical vibration sensors 2 in the present embodiment are as described above with reference to FIG. 1, although alternative optical vibration sensors in accordance with the invention could be used, for example, any of the embodiments described below with reference to FIGS. 8 to 10. The input device also comprises a control board 42, which comprises a processor 44. The control board 42 is used to control the operation of the optical vibration sensors 2, e.g., to turn them on when the input device 4 is activated. The input device 4 also comprises external ports 46 which may be used to connect the input device to an electronic device that is to receive the input from the input device. It is also possible that the electronic device may be used to control the input device and the optical vibration sensors remotely, e.g., to activate the optical sensors or to configure the input device 4 to operate in conjunction with another input device. It is also possible that data may be transmitted to the electronic device to be processed there rather than being processed on the on-board processor 44. Additionally or alternatively, in some embodiments, a wireless transceiver may be provided to allow the input device to be controlled and/or to provide input data remotely.

Figure 4:
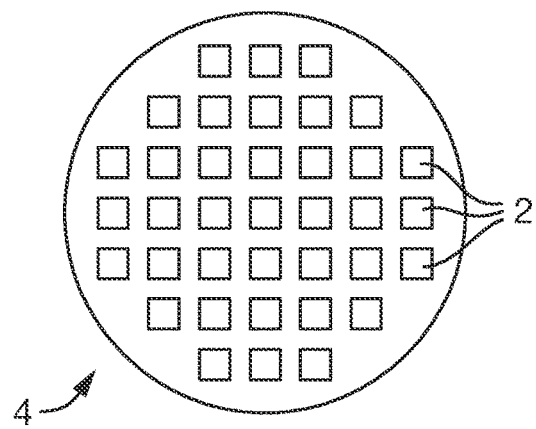
FIG. 4 shows a Cartesian coordinate layout of optical vibration sensors in an input device according to an embodiment of the invention.
Figure 5:
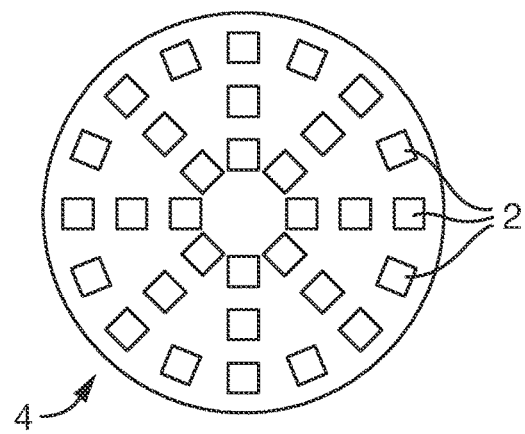
FIG. 5 shows a polar coordinate layout of optical vibration sensors in accordance with a further embodiment of the invention.

FIGS. 4 and 5 show two possible arrangements of the optical vibration sensors 2 in an input device 4. In FIG. 4, the optical vibration sensors 2 are arranged in a square lattice arrangement, so that the input device 4 detects vibrations at points on a Cartesian coordinate system. In FIG. 5, the optical vibration sensors 2 are arranged in concentric circles, so that the input device 4 detects vibrations at points on a polar coordinate system.

Figure 6A:
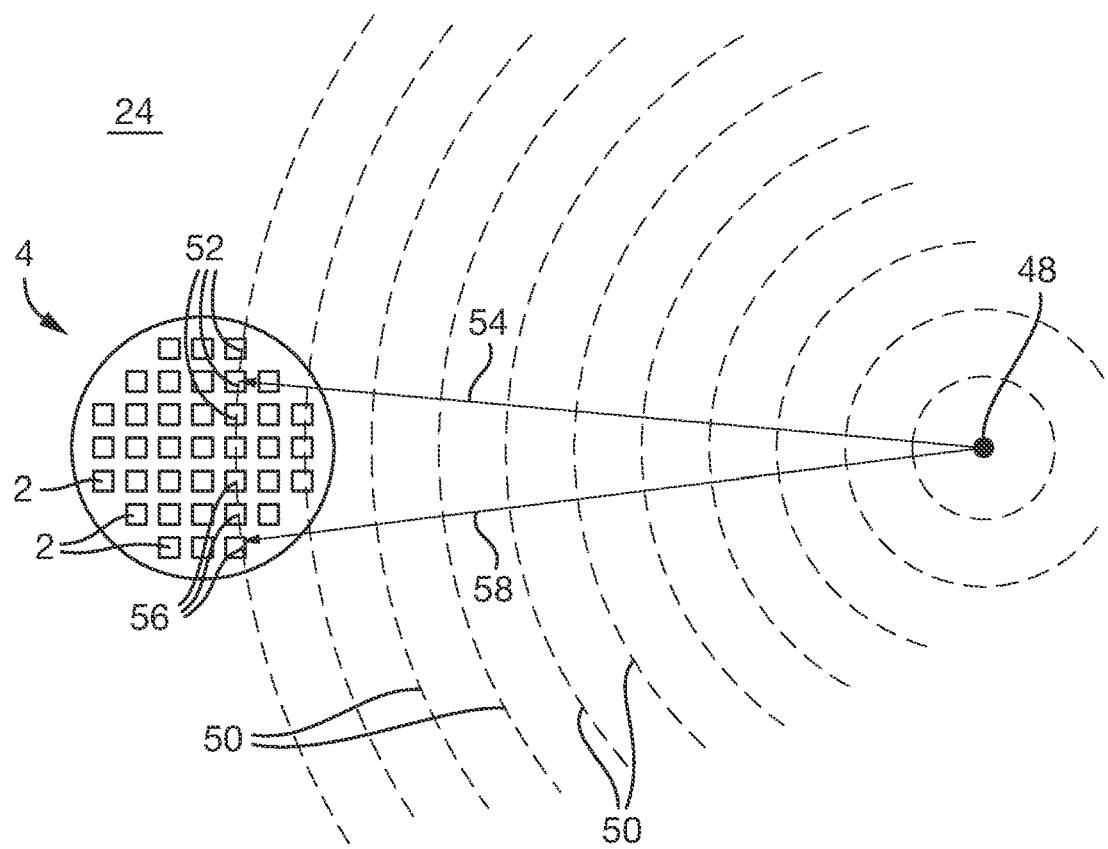
FIGS. 6a and 6b illustrate a method of determining the position of a touch in a nearfield region in accordance with the present invention.
Figure 6B:
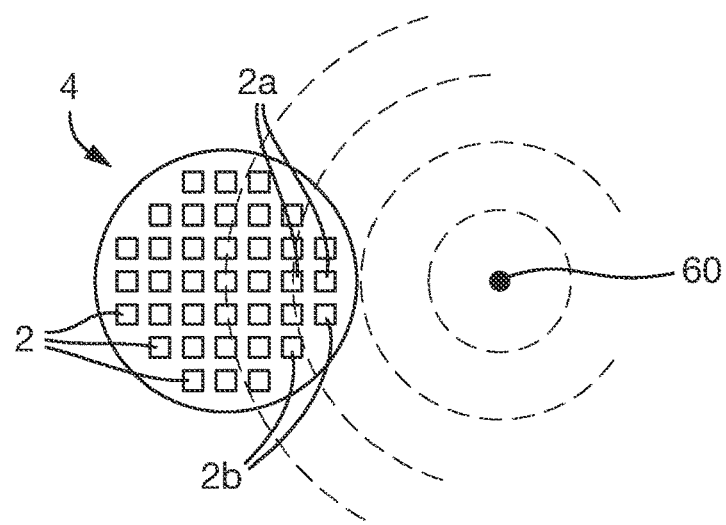

FIGS. 6a and 6b show an example method for determining the location of a point of contact on a surface using an input device in accordance with the invention. In FIG. 6a, an input device 4 comprising a two-dimensional square lattice array of optical vibration sensors 2 is placed on a surface 24. A user touches the surface 24 at a point of contact 48, and the touch causes vibrations in the surface 24. The vibrations propagate outwards radially from the point of contact 48, and are illustrated in FIG. 6a as concentric rings (or portions thereof) 50 indicating the propagating wavefronts of the vibrations. When the propagating vibration wavefronts 50 reach the surface underneath the optical vibration sensors 2 of the input device, the optical vibration sensors 2 detect the vibrations.

Each optical vibration sensor 2 detects a vibration having a particular phase and amplitude. The phases and amplitudes of a wavefront (in particular, of a plane wave) arriving at an array of detectors can be used to calculate the direction of arrival of the wavefront using known methods, for example, direction of arrival (DOA) algorithms such as MUSIC and ESPRIT. Using such methods, it is possible to determine from the phase and amplitude of detected incident waves at an array of detectors the direction of propagation of a plane wave.

In the embodiment depicted in FIG. 6a, the point of contact 48 is within the nearfield region of the input device 4. Nearfield, as used herein, means that the point of contact is less than approximately ten times the width of the array of optical vibration sensors. In the farfield (i.e., for a point of contact at a distance of more than ten times the array width), when the wavefronts reach the input device, the radius of curvature is sufficiently large that the vibrations can be treated as plane waves. However, in the nearfield, the wavefronts 50 still have some degree of curvature when they reach the input device 4.

The radius of curvature of an arriving wavefront can be determined by calculating the direction of arrival at various points across the widths of the array of optical vibration sensors 2. For example, at a first group of optical vibration sensors 52 the direction of arrival is in a first direction 54, while for a second group of optical vibration sensors 56, the direction of arrival is in a different direction 58. Accordingly, direction of arrival algorithms can be used to determine the curvature of the vibration wave fronts, and thus to determine the origin of the vibrations, because the radius of curvature depends on how far away the point of contact is. If the point of contact is far away, the wave fronts will be less curved, while if the point of contact is closer to the input device 4, the vibration wave fronts will be more curved, for example, as shown in FIG. 6b. The curvature of the wavefront could be determined using the relative phases of the incoming vibrations, using the relative amplitudes of the incoming vibrations, or using both. For example, as can be seen from FIG. 6b, each vibration wavefront impinging on the array of sensors 2 reaches some sensors 2a before it reaches other sensors 2b because the sensors 2a are closer to the point of contact on the surface than the sensors 2b. This shorter distance results in the vibrations reaching the sensors 2a and 2b having different phases, as well as different amplitudes (because, as mentioned above, the amplitude of the vibrations typically decays with distance R travelled by the vibration, e.g., 1/R or $1/\sqrt{R}$, depending on the type of vibrations). One or both of the relative phase(s) and amplitude(s) can therefore be used to determine the distance between the input device 4 and the point of contact.

Figure 7:
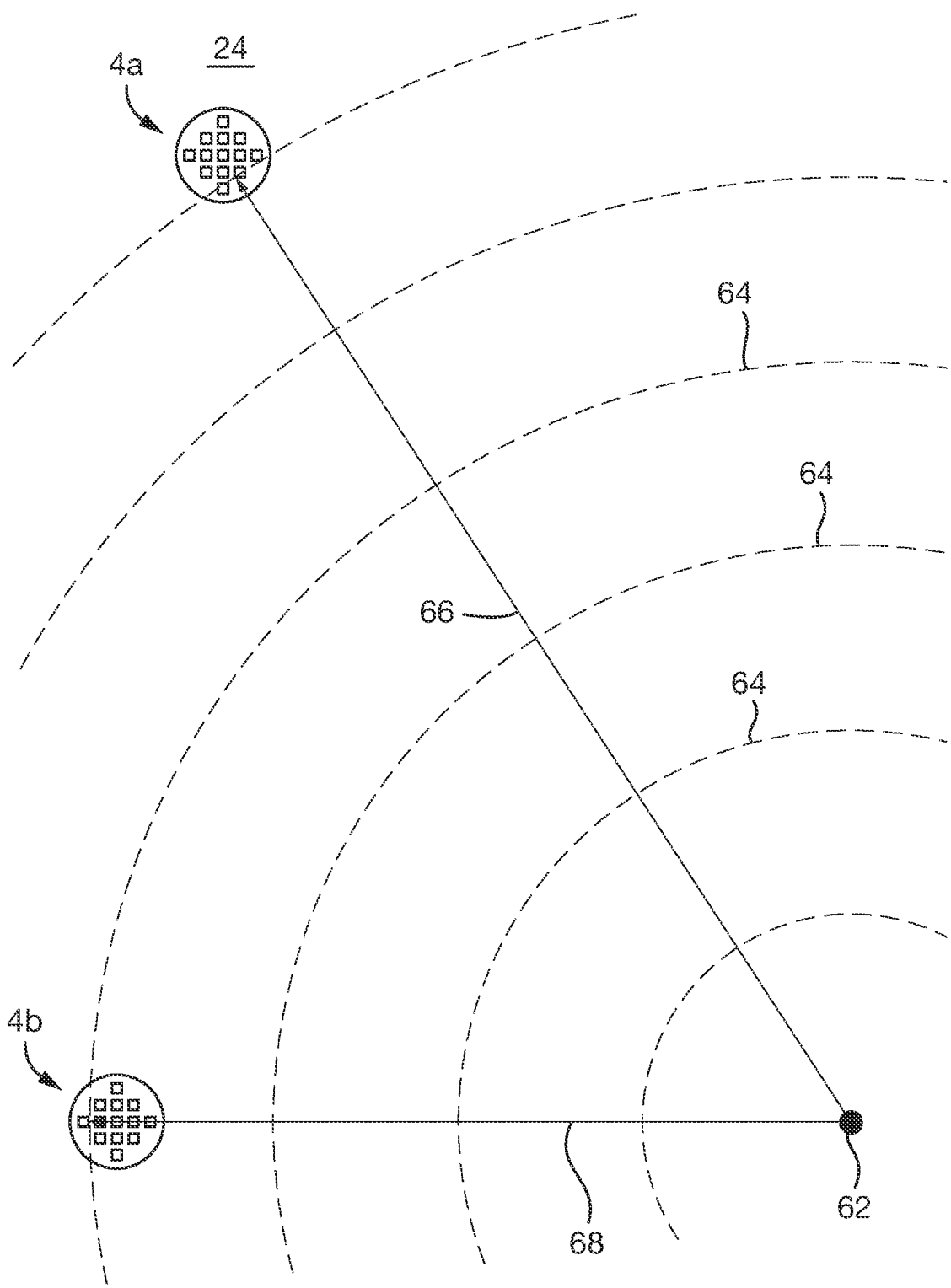
FIG. 7 illustrates a method of determining the position of a touch in a farfield region in accordance with the present invention.

FIG. 7 shows an alternative method for determining the location of a point of contact 62 on a surface 24. This method uses more than one input device, e.g., two input devices 4a, 4b. This method is suitable for determining the position of a point of contact 62 located in the far field region, i.e., where the distance between the point of contact and the input device is more than approximately 10 times the width of the array of optical vibration sensors in the input device. When the point of contact 62 is in the far field region, the wave fronts 64 of the vibrations originating at the point of contact 62 are approximately parallel when they reach the input device. Accordingly, while it is possible to determine the direction of arrival of the wave fronts, it is not possible to determine the distance to the point of contact 62 from the curvature of the wave fronts because the wave fronts are substantially planar.

Instead, the position of the point of contact 62 is determined using two input devices 4a, 4b that are placed at different locations on the surface 24. Each input device 4a, 4b determines a respective direction of arrival 66, 68. The position of the point of contact 62 can thus be calculated as the point at which lines 66 and 68 cross. Although it is particularly advantageous to have the two input devices 4a, 4b separated by a large distance (e.g., large compared to the width of the array of sensors 2), this method is also effective if the input devices are placed close together, although the precision with which position of the point of contact 68 is determined may be lower.

The direction of arrival may be calculated by each input device 4a, 4b, e.g., by an on board processor on each device. The input devices 4a, 4b may communicate with one another directly or via a remote device to calculate the points of origin 62. Alternatively, the data from the input devices 4a, 4b may be transmitted to a remote device, and the calculation of the point of origin may be calculated at the remote device.

It should be understood by those skilled in the art that exactly the same principle as is described above can be used to determine the direction of arrival of a plane wave or pseudo-plane wave (e.g., from a further-field finger contact) using an array of sensors in a single housing such as those shown in FIGS. 3 to 5. Although these will typically be closer together than in the embodiment shown in FIG. 7, the inherent low self-noise means that sufficient resolution is available to achieve this.

In a similar manner to that described with reference to FIG. 6b, the respective distances between the point of contact 62 and the input devices 4a, 4b can be determined using one or both of the relative phase(s) and the relative amplitude(s) of the vibrations. In the latter case having two physically separate devices may be beneficial in providing a bigger difference in amplitudes of signals arriving at them from a given point (and thus over different distances). Again however, this is not essential due to the low sensor self-noise described and so the amplitude only approach could equally be used in an array (of two or more sensors) in a single housing.

It is also possible to use vibrations received indirectly to determine the position of a point of contact. This is described below with reference to FIG. 8, including discussion of training the sensor by determining relevant parameters, e.g., relating to the surface properties.

A sensor array 100 in accordance with the invention is placed in contact with a surface 102. A finger 101 touches (or moves across) a point on the surface 102, generating vibrations. The acoustic energy of the vibrations travels in all directions, including the direction straight towards the sensor array 100. This is illustrated as wavefronts 103 and 104. Different wave modes will arise in the material, and those wave modes can have different speeds and hence arrive at the array 100 at different times. For example, tapping on the surface will create predominantly bending waves. An object or finger drawn across the surface will create Rayleigh (surface) waves, as well as shear waves. This is represented in FIG. 8 by the separation between the wavefronts 103 and 104, i.e., the wavefronts 103 and 104 represent different waves moving in the same direction but with different speeds.

In addition, there will be indirect waves impinging on the array 100, depicted as wavefronts 105, 106 arising from reflection of the vibrations from one edge of the surface 102 and wavefronts 107, 108 arising from a reflection from another edge of the surface 102. Again, different wave modes can have different speeds and thus arrive at the array 100 at different times, hence the separation of wavefronts 105, 106 and 107, 108 in the illustrations.

It will be appreciated that there will be many more wavefronts impinging on the array 100, as a result of one or more reflection from the boundary of the surface, but these are omitted form the Figure for clarity. Generally, later arriving signals will tend to be weaker than the first, direct signals and also than the first-order echoes, since the amplitude of the signal typically decays with distance R travelled by the vibration (e.g., 1/R or 1/√R, depending on the type of vibrations).

The direction and relative timings of arrival of the wavefronts depends on the shape, size and nature of the propagating medium. In some situations those aspects can be parameterized to cover, for example, a few key parameters like three-dimensional size (depth, width, height), the relative position and orientation of the array on the surface, as well as wave speeds of the most relevant wave modes. Given an initial estimate, those parameters could be estimated, inferred or observed from the tapping or sliding process.

The array housing could also be equipped with software and data describing a set of possible parameters (e.g., a set of parameter ranges) that could be later estimated from actual tapping or sliding data obtained in practice.

The tapping/sliding may happen in predefined locations ("training locations"), leading to a 'correct' estimation of the key parameters. Alternatively, the tapping/sliding may happen "blindly", i.e., the sensor detects a tap or slide, but exact or approximate tapping position is unknown to the sensor. Instead, it is possible to determine the location as well as the parameters due to the use of multiple sensors as will be explained below. In addition to increasing resolution and improving noise characteristics by averaging, the use of multiple sensors can create an overdetermined set of equations for estimating touch/slide positions. In contrast, just using two or three sensors could be just enough for estimating location, but not the parameters as well. This overdetermination can be used to determine the key parameters, because if those parameters are incorrectly estimated, the equation system would typically result in a poor match between the observed "raw accelerometer" data and the estimated location of the finger that could lead to such a position estimate.

Specifically, an example of tapping will now be considered, in which the tapping sound would be some kind of impulse that could be observed by the multiple sensors. Let the surface shape vector s=[x,y,z] hold the dimensions of the surface (believed to be a finite planar slab). Let p=[px, py] be the position of the centre of the sensor array and let θ be the orientation of the sensor array in the plane. Let c be the wave speed of the dominant wave mode in the surface upon tapping (assuming there is one), and let y1(t), y2(t), y3(t), . . . y_N(t) be the time series of signals received by the N accelerometers during some time interval t from T0, T0+1, . . . T1+(M−1). Let x be the (unknown) position of the finger tapping on the table.

Now clearly $y_i$ is a function of t, but also a function of all the other parameters:

$$y_i(t)=y_i(t|s,p,\theta,x,c,q_i) \qquad \text{Eq. 5}$$

where $q_i$ denotes the relative position of the $i^{th}$ sensor within the array, relative to the centre (this is typically a fixed parameter, i.e., not one that needs to be estimated). Now, given the family of signals $\{y_i(t)\}$ it is possible to construct directional edge detectors, that can pick up an edge of an impinging signal from a specific direction. One such approach is to use a matched filter with a thresholding function. Specifically, we can construct a set of filters $f_i^\phi(t)$ and apply (convolve with the signals) and add them up to get:

$$z^\phi(t) = \sum_{k=1}^{N} y_i(t) * f_i^\phi(t) \qquad \text{Eq. 6}$$

Typically, the filters (or signals) $f_i^\phi(t)$ will contain expected wavefronts as they would be expected to be observed by the sensors i=1, . . . N, i.e., with relative time delays, depending on the angle of arrival $\phi$ and the relative sensor position. A signal would then be detected—direct path or echoic at angle $\phi$ and at time T, for example, if $$z^\phi(T) \geq \text{Threshold}$$

This statistic can then be used to create an signal-ec Eq. 7 $E \in R^{Q,M}$, where Q is the number of different angles $\phi$ used for testing angularly impinging signals, and M is the number of time-samples in the time-window of interest (i.e., T0, T0+1, . . . T0+(M−1) as before). The elements of E will be defined as $$E_{ij} = \begin{cases} 1 & \text{if } z^{\phi_i}(T+j) > \text{Threshold} \\ 0 & \text{otherwise} \end{cases} \qquad \text{Eq. 8}$$

Where $\phi_i$ denotes the $i^{th}$ angle used in the angular sampling grid. In this case the matrix is a binary matrix, but a continuous matrix, measuring "degree" of detected impinging angular signals could also be used.

Recalling that if a "hypothetical touch" at a location x had been correctly estimated and with parameters s,p,θ,x,c,$q_i$, this would have given an estimate signal-echo-matrix Ê.

$$\hat{E}=\hat{E}(\hat{s},\hat{p},\hat{\theta},\hat{x},\hat{c},\{q_i\})$$

The estimated signal-echo-matrix could be obtained in Eq. 9 of different ways. For example, if the medium was a slab of a known or partially known material, one could simulate the propagation of acoustic energy, arising from a specific position using ray-tracing techniques. A simple model for such an approach would be room impulse response models, where one makes an informal analogy between a slab and an (empty) room. Publically available software packages exists for such approaches, see for instance the RIR Generator from International Audio Laboratories in Erlangen. Other, more complex approaches for estimating wave propagation and the resulting measurements of signals by accelerometer could be made for instance, via finite-element modelling. COMSOL is one commercially available toolbox.

If all the parameters are estimated correctly, i.e., the correct size of the surfaces, the relative position of the sensor array, the wave speed and the sensor array orientation have been found, then some suitable distance function $$d(\hat{E}, E)$$

should attain its minimum value over all possible values of parameter estimates. The distance function could be based on any suitable measure, such as an L1, L2 or LP norm of matrix differences. It could also be based on distance measurements after suitable filtering of the matrices E and $\hat{E}$, such as a preliminary smoothing of those matrices to allow for minor deviations from an exact fit between binary matrices. It could also be based on sum of minimum distances between the nearest neighbours in the matrices E and $\hat{E}$, or any other suitable measure. One can then use a general-purpose algorithm to search for the key parameters defining the surface of interest plus the relative location of the sensor array, i.e., the parameters s, p, θ, c. In this specific respect the position of the finger x is a nuisance parameter and $q_i$ are the fixed (not-to-be-estimated) relative positions of the individual sensor elements. In a typical embodiment of the invention, initial ranges or legal values may be set for those parameters, i.e., s∈S, p∈P, θ∈[0,2π], c∈C. To search the ranges for a minimum value of the function d(·) could be attained, for instance using the simplex algorithm. Other algorithms such as steepest-descent searches or conjugate gradient approaches based could equally well be used. Such approaches could use as input a small subset of estimated Signal-Echo matrices, compare those to the observed echo-signal matrices, and make one or more qualified estimates on the best directional changes in the parameter vector, so a gradually to obtain a better match. Multiple starting points for initializing the algorithm could be used.

Moreover, the same process could also use more sophisticated filters than pure edge filters. The filters could be designed to detect energy from some directions while suppressing those of others, perhaps in the form of weighted filters, i.e., using a kind of time-domain beamforming.

Also, the filters need not be limited to edge filters, but could also be filters detecting pure acoustic energy from a specific direction, i.e., a high level of sustained energy from a specific direction. This could be useful if the signal from the finger is not a tap, but a swipe motion, in which case there is likely to be less of a sharp rise of a signal. Tapping fingers: The above approach that was used for obtaining an estimate of the model could also be used subsequently for positioning of new touch events. Both the basic approach and the more sophisticated beam-forming-like approaches could be taken on. In this case, one could simply "lock" the estimated parameters s, p, θ, c and subsequently conduct much faster construction of hypothetical signal-echo matrices and match them with the observed data to estimate the location of the touch.

Sliding fingers: These are of particular interest and relevance since they related to events like pinch-to-zoom. In this case, however, the sound does typically not appear at the sensor array in the shape of an impulse signal trailed by later echoes. Instead, there is a continuous reception of signals, following the motion of the fingers on the surface and the resulting acoustic energy. This means that to some degree, the matrix $$E_{ij} = \begin{cases} 1 & \text{if } z^{\phi_i}(T+j) > \text{Threshold} \\ 0 & \text{otherwise} \end{cases} \qquad \text{Eq. 10}$$

is replaced by another matrix (or in fact a vector) which does not have the same type of time-resolution.

Determining the position of a tap or swipe using reflected signals (for example, in accordance with the embodiment of FIG. 8) is likely to require determining the direction of arrival of multiple incoming acoustic waves simultaneously. This is typically difficult to achieve for reasons explained below, but can be achieved in accordance with embodiments of the invention as explained below with reference to FIG. 9a-c.

Figure 9A:
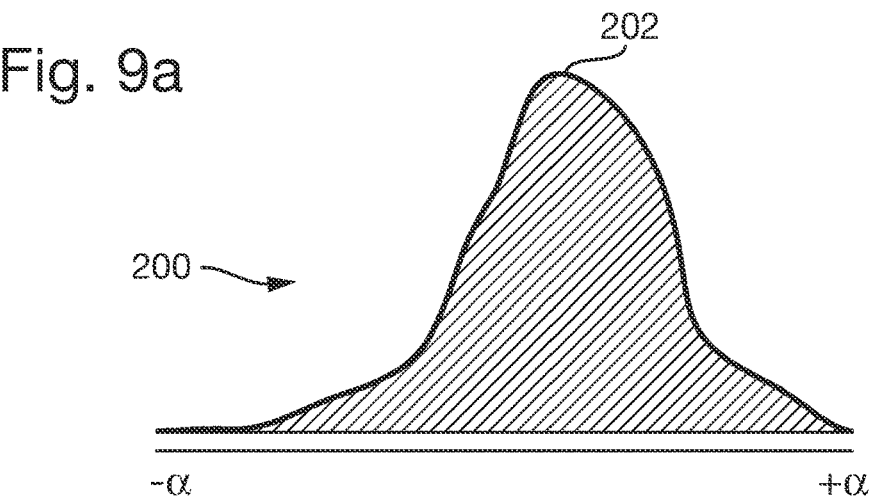
FIGS. 9a-9c show direction of arrival plots for a direct, echoic and composite (direct and echoic) acoustic signal received at a linear array of optical vibration sensors in accordance with an embodiment of the invention.

FIG. 9a shows a direction of arrival "score plot" 200 for a broadband acoustic signal detected using a linear array of optical vibration sensors in accordance with an embodiment of the invention. The score plot 200 shows the detected incoming energy (aggregated across all frequencies) from the acoustic signal as a function of the angle of arrival for a range of angles −α to α, determined using delay-and-sum beamforming. FIG. 9a shows only the direct signal, i.e., the signal that would be detected without any echoes from boundaries, etc. of the surface.

It can be seen that even though the acoustic wave energy comes from one angle (for the direct signal), energy is detected from a range of angles. This is because a delay-and-sum beamforming technique does not provide sufficient resolution when applied to a broadband signal to distinguish between close angular responses. This results in a spatial (i.e., directional) smearing of the signal, rather than a narrow peak being observed. A reasonably accurate determination of the direction of arrival can however be made based on the assumption that the direction of arrival corresponds to the peak 202 of the signal.

Figure 9B:
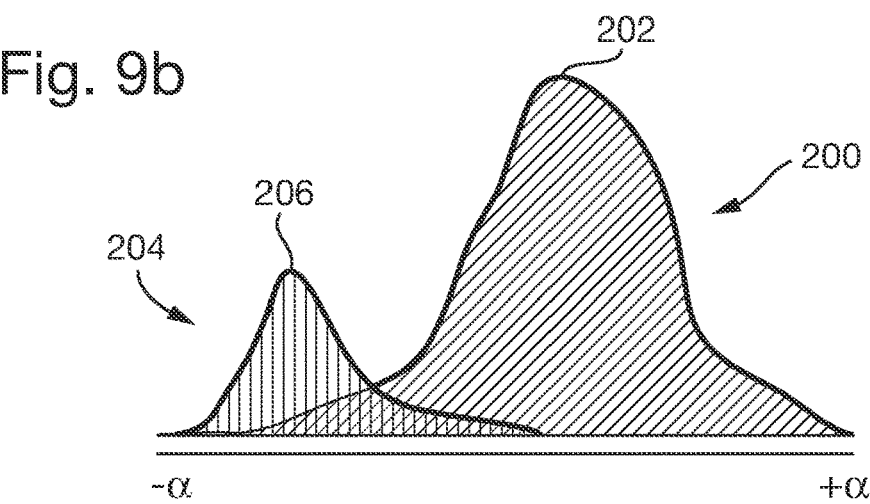

FIG. 9b shows (superimposed on the score plot 200 of FIG. 9a) the detected energy from an echo 204 of the direct signal giving rise to the plot of FIG. 9a. In this example, the echo results from the acoustic wave generated by the tap or swipe on the surface being reflected from a boundary of the surface (e.g., the edge of a table).

As the echo propagates from the boundary where it is reflected, it arrives at the sensor from a different direction from the direct signal 200. The echo shows spatial/directional smearing for the same reasons discussed above for the direct signal. However, it can be seen that the echo signal peak 206 is at a different angle from the direct signal peak 202, corresponding to a different general direction of arrival.

Figure 9C:
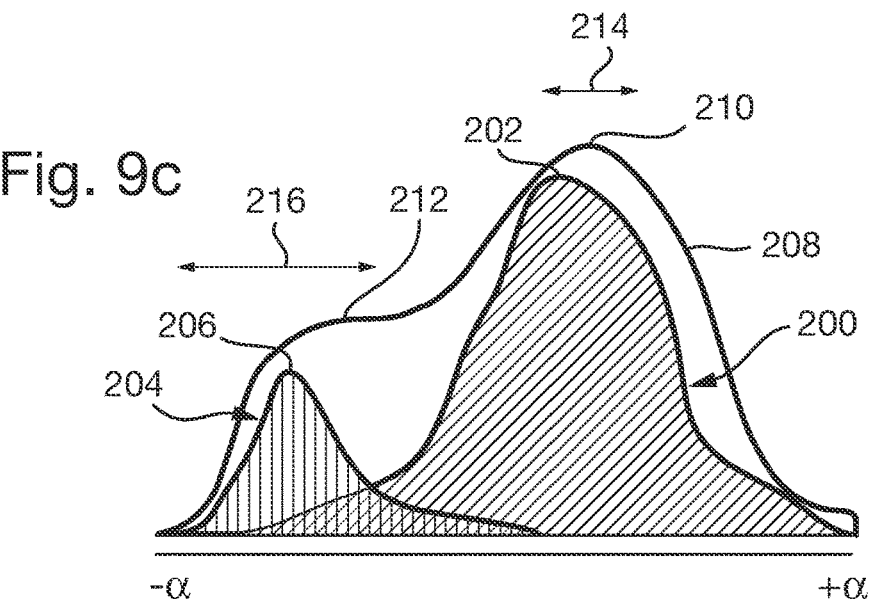

However, these two constituents 200, 204 (the direct signal and the echo) are not individually observable. Instead, the combined energy of the two signals would be observed, as shown in FIG. 9c. FIG. 9c shows the direct signal 200 and the echo 204, with the combined signal that would actually be detected shown by the solid line 208. It will be appreciated that in practice, many more echoes would typically be seen, depending on the physical parameters of the surface.

It can be seen that the two constituent signals of the direct signal 200 and the echo 204 are not easily distinguishable from each other. Further, although two peaks 210, 212 can be discerned, the position of those peaks 210, 212 are shifted relative to the peaks 202, 206 of the constituent signals, as represented by the arrows 214, 216. The arrow 216 representing the shift in the echo signal peak is larger, representing the fact that the peak of the echo 204 is shifted by a greater amount than the peak of the direct signal 200. However, even though the direct signal 200 is much stronger than the echo 204, the angular location of the peak 210 corresponding to the direct signal 200 is also still affected by the echo's signal 204, as represented by the smaller arrow 214.

It can be challenging to determine the peaks of the direct signal 200 and the echo 204 from the combined signal 208. Methods such as ESPRIT and MUSIC can be used, as well as snap-shot based methods such as those that use compressive sensing and L1-like approaches. However, the Applicant has devised a particularly advantageous approach to solving this problem that provides an improvement upon these methods, and this approach is described below.

The approach is based on the Applicant's appreciation that the direct signal is much stronger than any echoes, and therefore influences the shape of the echoic signals more than the echoic signals affect each other. By ignoring the contribution of the echoic signals, the direction of arrival of the direct signal can be determined. The direct signal (having a shape which is estimated through theoretical calculations or empirical observation) can then be subtracted from the observed (i.e., combined) signal, leaving a residual signal corresponding to the echoes. The residual signal consisting of the echoes can then be analysed to determine the position of the swipe or tap on the surface. This technique can be used to particular advantage for swipes on the surface that are (or have a substantial component) perpendicular to the linear array of optical vibration sensors. An example of this is shown in FIG. 10.

Figure 10:
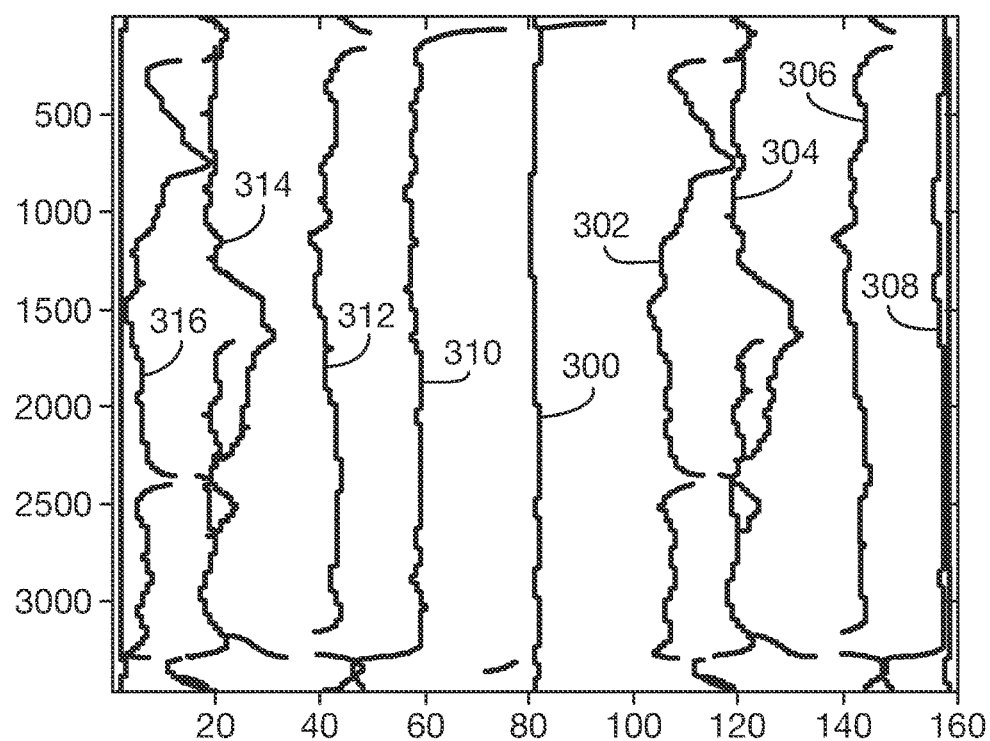
FIG. 10 is a plot showing the variation with time of the direct and echoic signals received at a linear array of optical vibration sensors in accordance with an embodiment of the invention.

FIG. 10 shows how a signal detected at a linear array of sensors varies over time for a swipe on the surface that is perpendicular to the linear array. The lines 300-306 correspond to peaks in the detected energy as a function of the direction of arrival of the signal. The central line 300 corresponds to a central peak in detected energy, which represents the direct signal detected by the array of sensors. As the swipe is normal to the linear array, the direction of arrival does not change significantly with time, because the point of contact with the surface is only moving towards and/or away from the linear array. The central line is therefore substantially straight, showing little change in angle over time. Little can be determined about the position of the point of contact with the surface from the central (direct signal) line. This is in contrast with a swipe substantially parallel to the linear array. In that case, the direct signal direction of arrival would vary as the point of contact moves from side to side.

The other lines 302-316 correspond to peaks representing the echoes that become visible after the central peak 400 has been subtracted. It can be seen that the direction of arrival of the echoes does vary with time. This is because the incoming acoustic signal travels via a reflection from a boundary of the surface (e.g., a table edge). The location and direction of a swipe can be determined using the residual echoes, because the angle of reflection (and thus the direction of arrival) of the echoes depends on how close the point of contact on the surface is to the array. This is explained further below with reference to FIG. 11.

Figure 11:
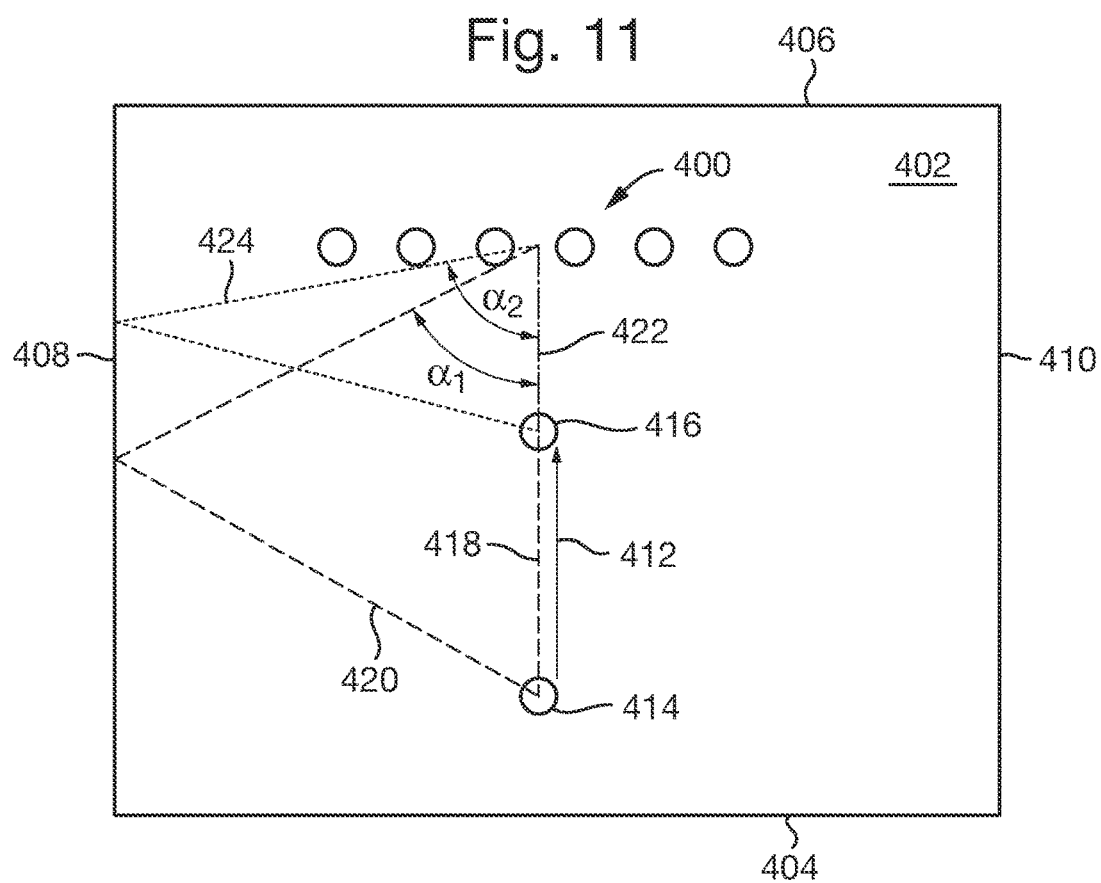
FIG. 11 shows the direction of arrival of direct and echoic signals received at a linear array of optical vibration sensors in accordance with the invention for a swipe perpendicular to the array.

FIG. 11 shows a linear array of optical vibration sensors 400 on a table surface 402, although as mentioned previously it could equally be provided underneath the table on the rear face of the surface. The table has front edge 404, a back edge 406, a left edge 408 and a right edge 410. A swipe on the surface is represented by the arrow 412. The swipe begins at a start location 414 and ends at an end location 416. Acoustic vibrations travel from the point of contact of the swipe as it moves from the start location 414 to the end location 416. Acoustic vibrations originating at the start location are shown by a first dashed line 418 for the direct signal and by a second dashed line 420 for the echo. Acoustic vibrations originating at the end location are shown by a first dotted line 422 for the direct signal and by a second dotted line 424 for the echo. The direct signals propagate directly to the linear array of acoustic vibration sensors 402, while the echoes propagate indirectly to the sensors 402 via a reflection from the left table edge 408.

It can be seen that the direct signals 418, 422 from the start and end locations 414, 416 both travel perpendicularly to the array of sensors, while the echoic signals 420, 424 arrive at an angle that varies from $\alpha_1$ for the start location 414 to $\alpha_2$ for the end location 416. Information regarding the movement of the swipe towards and away from the array can thus be discerned from the echoes 420, 424 based on the direction of arrival of each echo. The determination of the exact position of the point of contact during the swipe may be calculated using parameters relating to the surface (e.g., position of boundaries) and/or one or more other detected echo(es) and their direction(s) of arrival. For example, the position of the point of contact during the swipe may be accurately determined by matching the detected composite signal with a set of expected angular profiles and/or locations of echoes.

The Applicant has also appreciated that it is not necessary to detect/identify each echo individually. It is also possible to hypothise what the sum of all the echoes would look like for a given point of contact location and then match the hypothesized sum signal with the observed temporal data. This would amount to a 'matched spatial filter'. For example, in the case of a swipe motion, the continuous movement of the finger creates waves that are roughly stationary (or semistationary). Under this assumption, a Fourier-transform can be used on the set of received signals.

This will now be explained further, assuming that the finger is swiping over positions $x_i$, and that this motion causes i direct path signals/echoes, where the relative strength of the echoes in known from the geometry of the surface (e.g., table). In the discussion that follows, the signals are normalized so that the direct path echo signal has unit energy. For a specific frequency of interest $\omega$, the vector $Y(\omega)$ denotes the Fourier-transformed output of the sensor data. One coefficient of $Y(\omega)$ corresponds to one sensor output. Then, the hypothesized angular response from a touch/swipe on location $x_i$ at the array could be denoted as:

$$\hat{Y}_i(\omega) = \gamma_{i1}F_{i1}(\omega) + \gamma_{i2}F_{i2}(\omega) + \gamma_{i3}F_{i3}(\omega) + \ldots \gamma_{iN}F_{iN}(\omega)$$

Where $\gamma_{i1}=1$ and the other coefficients are less than 1. A large set of hypothesized array responses can be used, and then the observed array response can be matched with the set of estimated array responses, i.e.

$$\max_i \widehat{[Y_i]}^* Y_i,$$

which is a matched filter. The coefficients $\{\gamma_{ij}\}$ and the corresponding expected directional vectors $\{F_{ij}(\omega)\}$ are computed based on the estimated location and the model of the table/surface.

A further approach that can be used in accordance with embodiments of the invention is described with reference for FIGS. 12, 13a and 13b.

Figure 12:
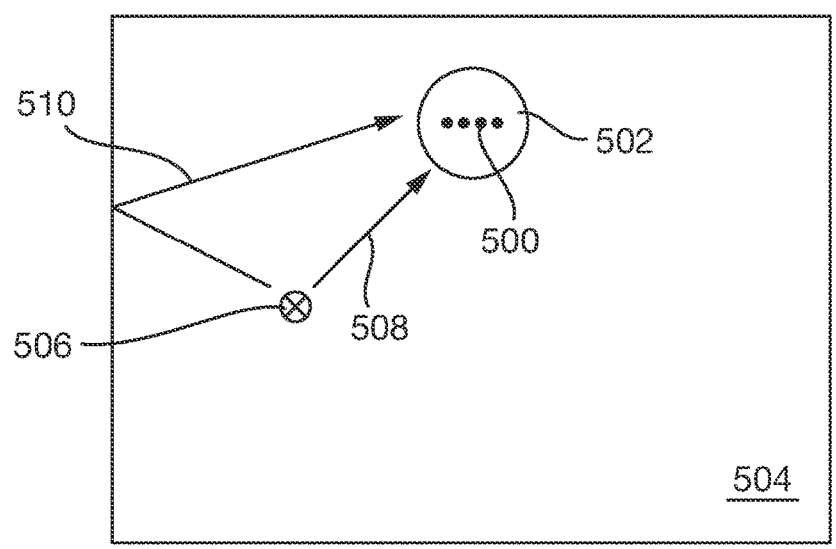
FIG. 12 shows a linear array of four sensors detecting a direct and echoic signal from a tap input on a surface.

FIG. 12 shows a table surface with a linear array of acoustic vibration sensors 500 contained in a housing 502. In this non-limiting example, there are four sensors. The housing is resting on a table surface 504. The position 506 of an expected touch/swipe point is shown. The corresponding direct path 508 and echo path 510 are also shown.

Figure 13A:
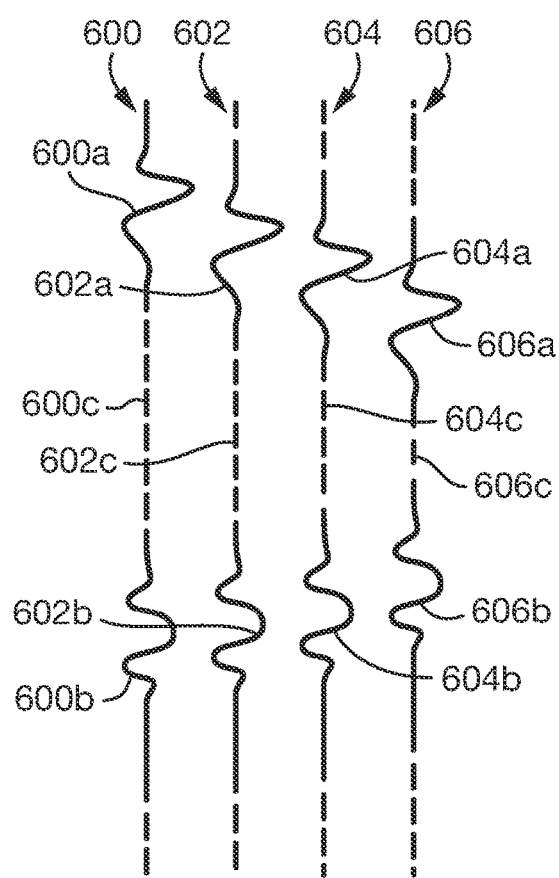
FIGS. 13a and 13b show estimated partial impulse responses for the tap input shown in FIG. 12.
Figure 13B:
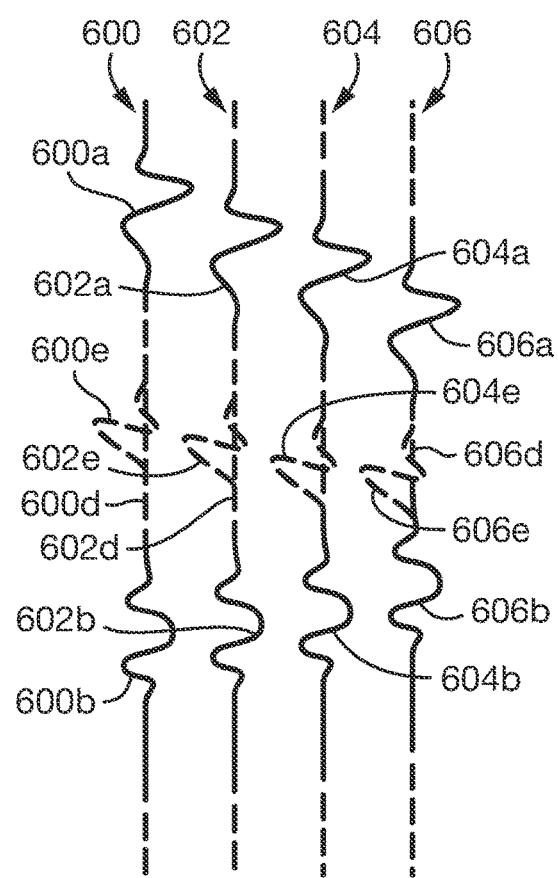

FIG. 13a shows an estimated partial array response for the four acoustic sensors. The response comprises four curves 600, 602, 604, 606, each corresponding to the expected detected signal at each of the four sensors respectively. Each curve 600, 602, 604, 606 contains two pulses 600a, 600b, 602a, 602b, 604a, 604b, 606a, 606b which correspond to the direct signal and echoic signal expected at that sensor for the expected point of contact 506. Between the pulses, the curve is shown as a dotted line 600c, 602c, 604c, 606c. The dotted line indicates that it is not known what to expect in that region. For example, while it might not be expected for any additional echo from the left table edge 408 to be received between the direct signal and the echo depicted in FIG. 12, it is possible that an echo from a different boundary (e.g., right table edge 410) could be detected during that time. This possibility is illustrated in FIG. 13b. The possibility that nothing is detected corresponds to the substantially straight dotted lines 600d, 602d, 604d, 606d. However, it is also possible that a further pulse 600e, 602e, 604e, 606e is detected by each sensor in this time, e.g., an echo from another boundary of the table surface.

The significance of this is that it does not matter what is detected in the regions shown in dotted lines. This is in contrast with methods of the prior art which use training to build a database of 'fingerprints', i.e., recording the full acoustic response detected for certain specified training taps/swipes, and then matching those to subsequently detected input taps/swipes to determine the position of the input taps/swipes. In such approaches it is necessary to determine the impulse response for each possible tap/swipe completely. This requires a time-consuming and inconvenient training procedure prior to use each time the sensor device is set up on a surface.

The method described with reference to FIGS. 12, 13a and 13b does not require the sensor array to be trained because it is not necessary to perfectly determine the complete impulse response for a given tap/swipe location. Instead, it is only necessary to find a best match to an assumed partial impulse response from a set of possible partial impulse responses, i.e., it does not have to be a perfect match. Preferably the best match should be above a certain threshold to prevent false positive touch indications.

An example of this approach is described in detail below.

Assume that there are N hypothetical points on the touch surface, $p_1, p, \ldots, p_N$. Then a touch or swipe event happens at the surface, by the finger impacting or swiping along the surface, and this is recorded as signals $y_1(t), y_2(t), \ldots y_Q(t)$ at sensors $1, 2, \ldots Q$ respectively, with time intervals t, t+1, ... t+L−1, assuming some sampling frequency $f_s$ and where L is sampling window length.

Furthermore, it has previously been estimated, or computed by tracing the direct path signals and echoes, that each point, $p_1, p, \ldots, p_N$ may be associated with an estimated signal at sensors $1, 2, \ldots Q$. These estimated signals may be described as signals:

$$x_{ij}(t)$$

where i is the point index (i.e., referring to points $p_1, p, \ldots, p_N$) and j the sensor index, i.e., referring to sensor $1, 2 \ldots Q$, and again with the signals sampled at an interval t, t+1, . . . t+L−1.

It may not be possible to compute every part of this signal accurately, since the signal is being constructed largely based on direct path signals and reflections of some specific wave modes. In other words, there may be other wave modes that are too complex to model or approximate without more detailed knowledge of the material in the surface, its size, and potential environmental parameters. Therefore, a weight $w_{ij}(t)$ is associated with each $x_{ij}(t)$, where each $w_{ij}(t)$ is typically in the range [0,1], which reflects the level of 'belief' in the correctness of the signal, i.e., the level of certainty that the signal is correct.

Then, to estimate the location of the impacting finger, a score $s_i$ is computed, where $$s_i = \sum_{j=1}^{Q} \sum_{r=0}^{L-1} y_j(t+r) x_{ij}(t+r) w_{ij}(t+r)$$

which essentially matches the receive signal vectors $y_1(t), y_2(t), \ldots y_Q(t)$ with the weighted, estimated impulse response associated with a location $p_i$. It is then possible, for instance, to compute the maximum over all the $s_i$, and choose that location as the estimated finger position.

It may also be required, for example, that the $s_i$ is above a certain threshold, to avoid accidental touch or swipe detection, or require that the selected $s_i$ is above a certain threshold relative to the distribution given by the other, non-selected scores, i.e., to detect that $s_i$ is a "clear winner". It could for instance be a certain number of times higher than the average value of the scores.

This may be useful, because it is difficult to set an exact expected "match energy level" because this will be related to the "force" of the touch/swipe or tap motion, which is typically not known. In this case, each signal $x_{ij}(t)$, could be modelled.

The matching above can clearly also be carried out in the frequency domain, by doing a Fourier transform on the signals and then doing the correlation/matching in frequency domain. It could also be done in any other suitable domain, such as fractional Fourier domain or using wavelets or other suitable basis representation approaches.

In some situations, it may be difficult to accurately estimate or gauge the exact 'shape' of the signal $x_{ij}(t)$, even at those locations where it is known or assumed that there is an echo. This can be the result of damping and magnification of certain frequencies, or certain smaller phase differences. In this case it could instead be assumed that $x_{ij}(t)$ is viewed as a result of linear combinations of certain basis signals. Letting $x_{ij}$ denote the vectorised/sampled version of the signal, i.e., $x_{ij}=[x_{ij}(t), x_{ij}(t+1), \ldots, x_{ij}(t+L-1)]$, then it is possible to use the expression $$x_{ij}=B_{ij}\alpha_{ij}$$

where $B_{ij}$ contains, as its columns, vectors whose linear combination could amount to the actual (and later weighted) impulse response signal associated with location $p_i$. The score $s_i$ above could then be recomputed with another level of 'max' operations, i.e., with an additional level of maximization, this time over the set of possible vectors $\alpha_{ij}$, subject to some constraint to avoid the trivial scale-to-infinity solution. One example would be the constraint $\|\alpha_{ij}\|_2^2 = 1$.

More sophisticated approaches such as deconvolution (instead of correlation/matching) of hypothesized signals against real signals could be used.

The approach described above is particularly advantageous as it obviates the need to train the array of sensors, e.g., by performing a sequence of known taps and/or swipes to allow the sensor array to compute certain parameters used in the analysis of subsequent input taps/swipes. The use of an estimated partial impulse response avoids the need to build up a database of full impulse responses for specified touch inputs.

Figure 14:
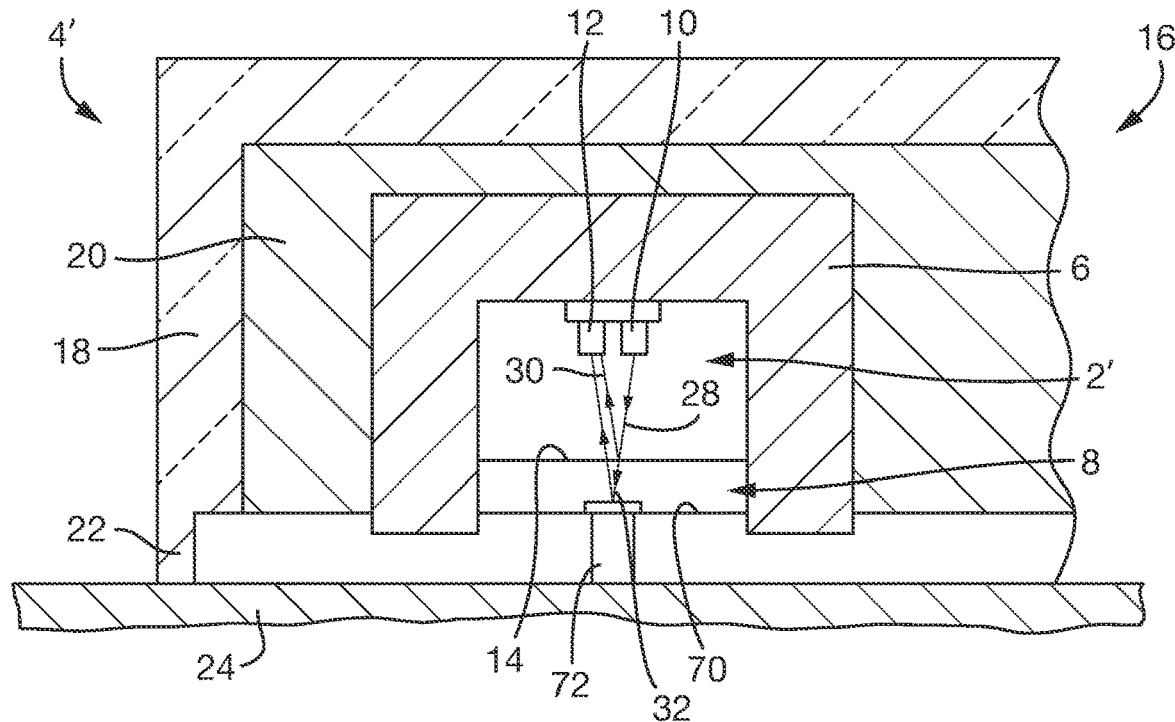
FIG. 14 shows an optical vibration sensor in an input device in accordance with a second embodiment of the present invention.
Figure 15:
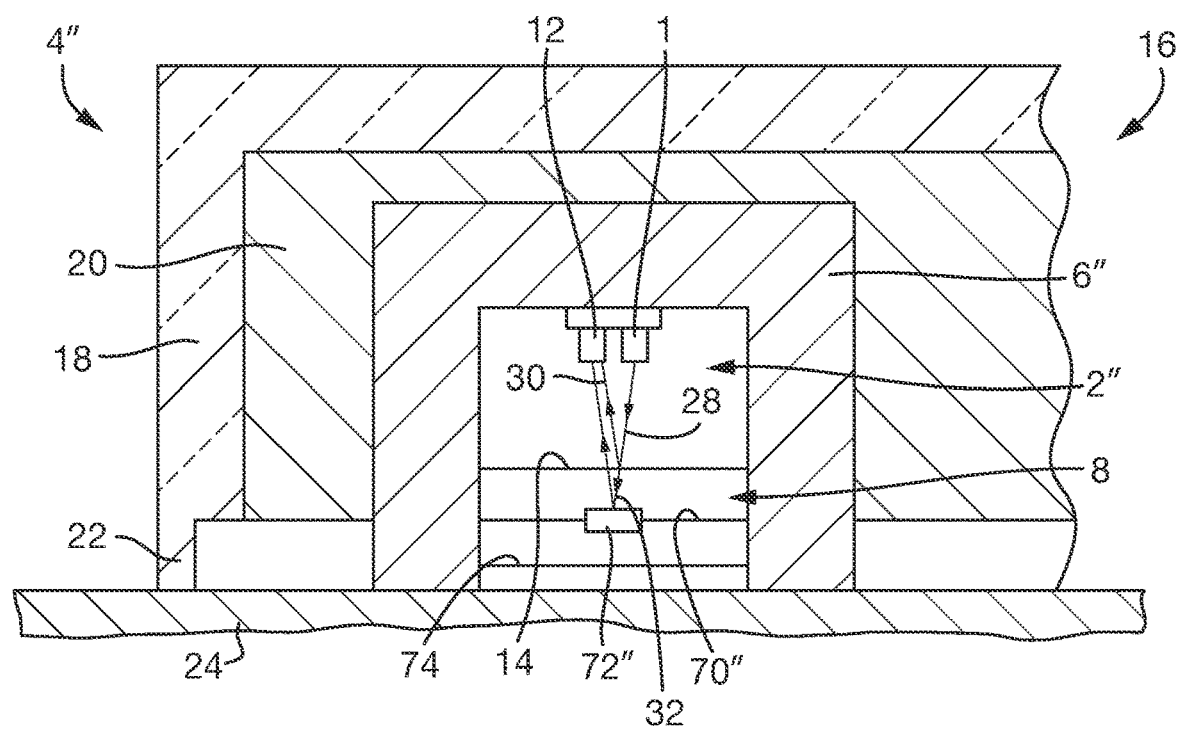
FIG. 15 shows an optical vibration sensor in an input device in accordance with a third embodiment of the present invention.
Figure 16:
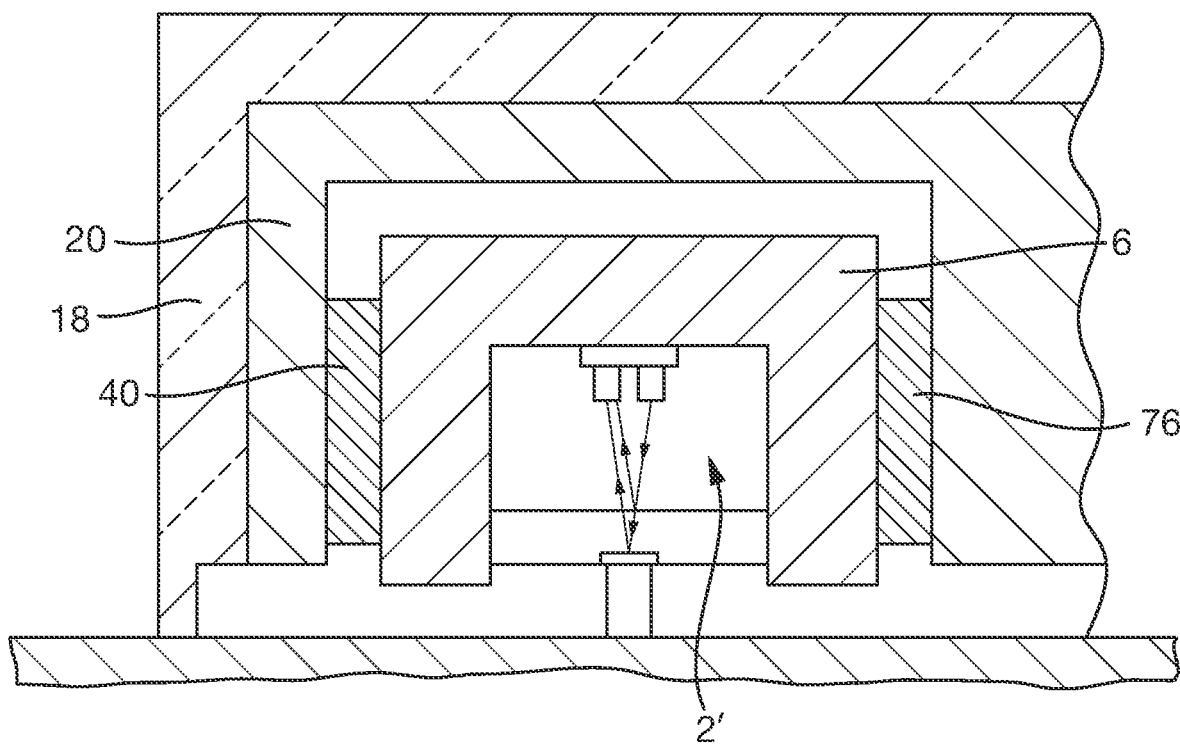
FIG. 16 shows a variation on the embodiment shown in FIG. 14.

FIG. 1, as discussed above, shows one possible construction of an optical vibration sensor in an input device in accordance with the present invention. It will be appreciated that variations and other embodiments with different constructions are possible. FIGS. 14 to 16 shows three examples of alternative constructions of optical vibration sensors that may be used in accordance with the present invention.

FIG. 14 shows a second embodiment of an optical vibration sensor 2' in an input device 4'. The optical vibration sensor 2' is mounted in a housing 6, and comprises a laser diode 10, a photo detector 12 and a membrane 14 configured in the same manner as the corresponding components in the embodiment of FIG. 1. The optical vibration sensor 2' differs from the optical vibration sensor 2 of FIG. 1 in that it comprises a membrane 70 disposed across the opening 8 in the sensor housing 6. A reaction mass 72 is attached to the centre of the membrane 70.

The input device 4' comprises a main housing 16, which comprises an outer housing portion 18 and inner housing portion 20. The main housing 16 has the same structure as the main housing 16 of the embodiment of FIG. 1, including a rim 22 that contacts a surface 24 in use. The inner housing portion 20 is also made of foam to suppress the propagation of vibrations. In this embodiment, no reflective mat is provided on the surface 24. The reaction mass 72 is shaped and positioned so that when the input device 4 is placed on the surface 24 during use, the reaction mass 72 is in contact with the surface 24.

When a user touches the surface 24, vibrations caused by the touch propagate through the surface 24 to the reaction mass 72, which vibrates with the surface 24. As in the first embodiment, the sensor housing 6 is not in contact with the surface 24, and the inner housing portion 20 prevents the propagation of vibrations from the outer housing portion 18 to the sensor housing 6. Consequently, the housing 6 remains substantially stationary, while the reaction mass and the membrane vibrate due to the vibrations in the surface 24.

In an equivalent manner to that described with reference to FIG. 1, the laser diode 10 produces a laser beam 28, a first portion 30 of which is reflected by the grating 14 and impinges on the photo detector 12, and a second portion 32 of which is transmitted and diffracted by the grating, and is then reflected from the surface of the reaction mass 72 onto the photo detector 12. The vibration of the reaction mass 72 varies the distance between the grating 14 and the reaction mass 72, and consequently an interference pattern produced at the photo detector 12 by the first and second portions 30, 32 varies with the vibrations.

FIG. 15 shows a third embodiment of an optical vibration sensor 2" in an input device 4". The optical vibration sensor 2" is mounted in a housing 6" which, in contrast with the embodiments of FIGS. 1 and 14, is shaped and positioned so that it is in contact with the surface 24 when the input device 4" is placed on the surface 24. The optical vibration sensor 2" comprises a laser diode 10, a photo detector 12 and a grating 14 mounted in the housing 6" and arranged in an equivalent manner to the corresponding components in FIGS. 1 and 14. The optical vibration sensor 2" also comprises a membrane 70". In contrast with the membrane 70 of FIG. 14, the membrane 70" is positioned inside the sensor housing 6" away from the opening 8 in the sensor housing 6". In the present embodiment, a cover 74 is provided to cover the opening 8 of the sensor housing. The cover 74 advantageously helps to protect the components in the sensor housing 6", for example, protecting them from mechanical damage, from dust, etc. The membrane 70 is provided with a reaction mass 72". In contrast with the embodiment of FIG. 14, the reaction mass does not contact the surface 24 during use of the input device 4".

The input device 4" comprises a main housing 16", which comprises an outer housing portion 18" and an inner housing portion 20. In contrast with the embodiments of FIGS. 1 and 14, the outer housing portion 18" does not contact the surface 24 during use of the input device 4". Instead, the input device 4" is supported during use by the sensor housing 6" resting on the surface 24.

The optical vibration sensor 2" detects vibrations in the same manner as described above with reference to FIG. 14, i.e., by using an interference pattern generated by first and second portions of light 30, 32 reflected from the grating and the reaction mass respectively. However, the relative motion between the grating 14 and the reaction mass 72" is created in a different way in the embodiment of FIG. 15. As the sensor housing 6" is in contact with the surface 24, vibrations in the surface 24 propagate to the sensor housing 6". As the reaction mass 72" is not in contact with the surface 24, and is supported only by the membrane 70", which is flexible, the vibrations in the sensor housing 6" do not propagate to the reaction mass 72". Instead, the inertia of the reaction mass 72" results in the sensor housing 6" moving relative to the reaction mass 72". Consequently, the vibration of the sensor housing 6" results in relative movement of the reaction mass and the grating, resulting in the interference pattern detected at the photo detector 12 varying with the amplitude of the vibrations.

It will be appreciated that although only one optical vibration sensor is depicted in each of FIGS. 1, 14 and 15, the input devices 4, 4', 4" each comprise a plurality of optical vibration sensors 2, 2', 2". The inner housing portion 20, which prevents vibrations propagating from the outer housing portion 18 to the optical vibration sensors 2, 2', 2", also prevents vibrations propagating from each sensor housing 6, 6" to reduce or eliminate cross talk between the input optical vibrational sensors.

FIG. 16 shows a variant of the embodiment of FIG. 14, in which the sensor housing 6 is mounted in the inner housing portion 20 by an elastic suspension 76. The elastic suspension 76 serves to further reduce or prevent vibrations propagating to the sensor housings 6 from adjacent sensor housings 6 and/or from the outer housing 18. The elastic suspension 76 shown in FIG. 4 could also be incorporated in the embodiments shown in FIGS. 1 and 15.

It will be appreciated that the embodiments described above are only examples, and that variations are possible within the scope of the invention.

The invention claimed is:
1. An input device for detecting vibrations in a solid body when the input device is in contact with a surface of said solid body, the device comprising:
   a main housing;
   a plurality of sensor units mounted in the main housing, each sensor unit comprising a sensor housing and an optical vibration sensor mounted in the sensor housing, wherein each optical vibration sensor comprises:
      a diffractive optical element;
      a light source arranged to illuminate said diffractive optical element such that a first portion of light passes through the diffractive optical element and a second portion of light is reflected from the diffractive optical element; and
      a photo detector arranged to detect an interference pattern generated by said first and second portions of light;
   wherein the optical vibration sensor is configured so that in use, after the first portion of light passes through the diffractive optical element, the first portion of light is reflected from a reflective surface onto the photo detector;

wherein an average density of each sensor housing is higher than an average density of the portion of the main housing connecting the sensors.

2. The input device of claim 1, wherein the input device is configured to determine information regarding a point of contact of an object with the surface from a detected composite signal comprising direct and indirect vibrations.

3. The input device of claim 2, wherein the input device is configured to determine information regarding the point of contact of the object with the surface from a residual signal obtained by subtracting an estimate of a direct signal from the composite signal.

4. The input device of claim 2, wherein the information regarding the point of contact comprises a position of the point of contact of the object on the surface of the solid body.

5. The input device of claim 1, wherein the input device is configured to determine information regarding a point of contact of an object with the surface using one or more estimated partial impulse responses, wherein each estimated partial impulse response is an estimate of part of a composite signal that is expected to be detected by an array of optical vibration sensors for a corresponding expected touch input.

6. The input device of claim 1, wherein the input device is configured to use a range or subset of frequencies of the vibrations preferentially or exclusively to determine information about a point of contact of an object on the surface of the solid body.

7. The input device of claim 1, wherein the input device is configured to determine one or more parameters relating to at least one of i) the solid body and ii) a position of the input device on the solid body.

8. The input device of claim 1, wherein the reflective surface from which the first portion of light is reflected is the surface of the solid body.

9. The input device of claim 1, wherein each optical vibration sensor comprises a membrane.

10. The input device of claim 9, wherein the membrane comprises the reflective surface from which the first portion is reflected.

11. The input device of claim 1, wherein each optical vibration sensor comprises a mechanical coupling between the membrane and the solid body surface.

12. The input device of claim 11, wherein the mechanical coupling comprises a mass attached to the membrane.

13. The input device of claim 1, wherein the main housing and the sensor housings together define a common housing, wherein the common housing is shaped so that it is in contact with the solid body only at a periphery of the common housing when the input device is resting on a substantially planar surface of the solid body in use.

14. The input device of claim 1, wherein the main housing and the sensor housings of the plurality of sensor units together define a common housing, and wherein the common housing is shaped so that there is physical contact between the common housing and the solid body in regions of the common housing adjacent to the optical vibration sensors when the input device is resting on a substantially planar surface of the solid body in use.

15. The input device of claim 1, wherein the sensor housings are positioned so that they are in contact with the solid body surface when the input device is resting on a substantially planar surface of the solid body in use.

16. The input device of claim 1, wherein each sensor housing is mounted in the main housing by means of a flexible suspension.

17. The input device of claim 1, wherein the sensor housings of the plurality of sensor units are made from a material with a density above 2.5 g/cm$^3$.

18. The input device of claim 1, wherein a portion of the main housing connecting the sensors is made from a material with a density that is at least one of i) below 0.5 g/cm$^3$ and ii) less than 20% of the density of the sensor housing material.

19. The input device of claim 1, wherein the input device has at least one of the following dimensions:
a maximum dimension of the input device that is less than 0.2 m;
a separation between adjacent sensor housings that is less than 1 cm; and
a separation between adjacent optical vibration sensors that is less than 4 cm.

20. The input device of claim 1, wherein the plurality of optical vibration sensors in the input device is arranged in an array.

* * * * *